United States Patent
Kuribayashi

(10) Patent No.: US 10,901,337 B1
(45) Date of Patent: Jan. 26, 2021

(54) OPTICAL SCANNING DEVICE AND IMAGE FORMING APPARATUS

(71) Applicant: TOSHIBA TEC KABUSHIKI KAISHA, Tokyo (JP)

(72) Inventor: Yasushi Kuribayashi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/875,084

(22) Filed: May 15, 2020

(30) Foreign Application Priority Data

Jul. 1, 2019 (JP) .................................. 2019-122962

(51) Int. Cl.
*G03G 15/04* (2006.01)
(52) U.S. Cl.
CPC .............................. *G03G 15/04036* (2013.01)
(58) Field of Classification Search
None
See application file for complete search history.

(56) References Cited

U.S. PATENT DOCUMENTS 9,880,489 B2 * 1/2018 Kurihara .............. G02B 26/124
10,425,551 B2 * 9/2019 Kuribayashi .......... H04N 1/113

FOREIGN PATENT DOCUMENTS

JP H10-104540 A 4/1998

* cited by examiner

*Primary Examiner* — Roy Y Yi
(74) *Attorney, Agent, or Firm* — Kim & Stewart LLP

(57) ABSTRACT

An optical device includes a first light source emitting a first beam, a second light source emitting a second beam and arranged upstream in a scanning direction, a diaphragm including an opening passing portions of the first beam, the first portion having a first width from the light axis of the first beam on the upstream side, the second portion having a second width from the light axis on the downstream side, the first width narrower than the second width, and an opening passing portions of the second beam, the first portion having a third width from the light axis of the second beam on the upstream side, the second portion having a fourth width from the second light axis on the downstream side, the third width wider than the fourth width, and a deflector deflecting on a surface thereon the beams at positions shifted in a sub scanning direction.

20 Claims, 22 Drawing Sheets

UPSTREAM SIDE ⟶ DOWNSTREAM SIDE

MAIN SCANNING DIRECTION

UPSTREAM SIDE →  DOWNSTREAM SIDE

MAIN SCANNING DIRECTION

UPSTREAM SIDE ⟶ DOWNSTREAM SIDE

MAIN SCANNING DIRECTION

OPTICAL SCANNING DEVICE AND IMAGE FORMING APPARATUS

CROSS-REFERENCE TO RELATED APPLICATIONS

This application is based upon and claims the benefit of priority from Japanese Patent Application No. 2019-122962, filed on Jul. 1, 2019, the entire contents of which are incorporated herein by reference.

FIELD

Embodiments described herein relate generally to an optical scanning device and an image forming apparatus.

BACKGROUND

An electrophotographic image forming apparatus forms an electrostatic latent image by scanning a light beam across an image surface. Such an image forming apparatus passes the beam through a diaphragm (e.g., an iris-like diaphragm or aperture limiter) for improving the image quality by limiting beam size. The beam shaped by the diaphragm is then reflected by a rotating polygonal mirror and passed through scanning optics to scan the image surface.

By using a polygon mirror that has many reflective surfaces, it is possible to reduce the number of parts of the image forming apparatus, and thereby reduce its manufacturing cost. However, it is known that vignetting (that is, a phenomenon related to differences in brightness or the like between center and periphery of the beam) occurs in the beam when such a polygon mirror is used.

DETAILED DESCRIPTION

One or more embodiments provide an optical scanning apparatus and an image forming apparatus having a plurality of types of polygon mirrors having different number of surfaces are used.

In one embodiment, an optical scanning device comprises a first light source configured to emit a first beam, a second light source configured to emit a second beam and arranged on an upstream side of the first light source in a main scanning direction, and a diaphragm. The diaphragm includes a first opening that passes first and second portions of the first beam, the first portion having a first width from a first light axis of the first beam on the upstream side in the main scanning direction, the second portion having a second width from the first light axis on a downstream side in the main scanning direction, the first width being narrower than the second width, and a second opening that passes first and second portions of the second beam, the first portion having a third width from a second light axis of the second beam on the upstream side in the main scanning direction, the second portion having a fourth width from the second light axis on the downstream side in the main scanning direction, the third width being wider than the fourth width. The optical scanning device further comprises a deflector configured to deflect the first and second beams that have passed through the diaphragm at first and second positions on a surface of the deflector, the first and second positions being shifted in a sub scanning direction perpendicular to the main scanning direction.

Hereinafter, an image forming apparatus according to embodiments will be described with reference to the drawings. Each of the drawings used in the description of the following embodiments may change the scale of each part as appropriate for purposes of explanation. In addition, one or more parts may be omitted from the drawings for the purpose of explanation.

Figure 1:
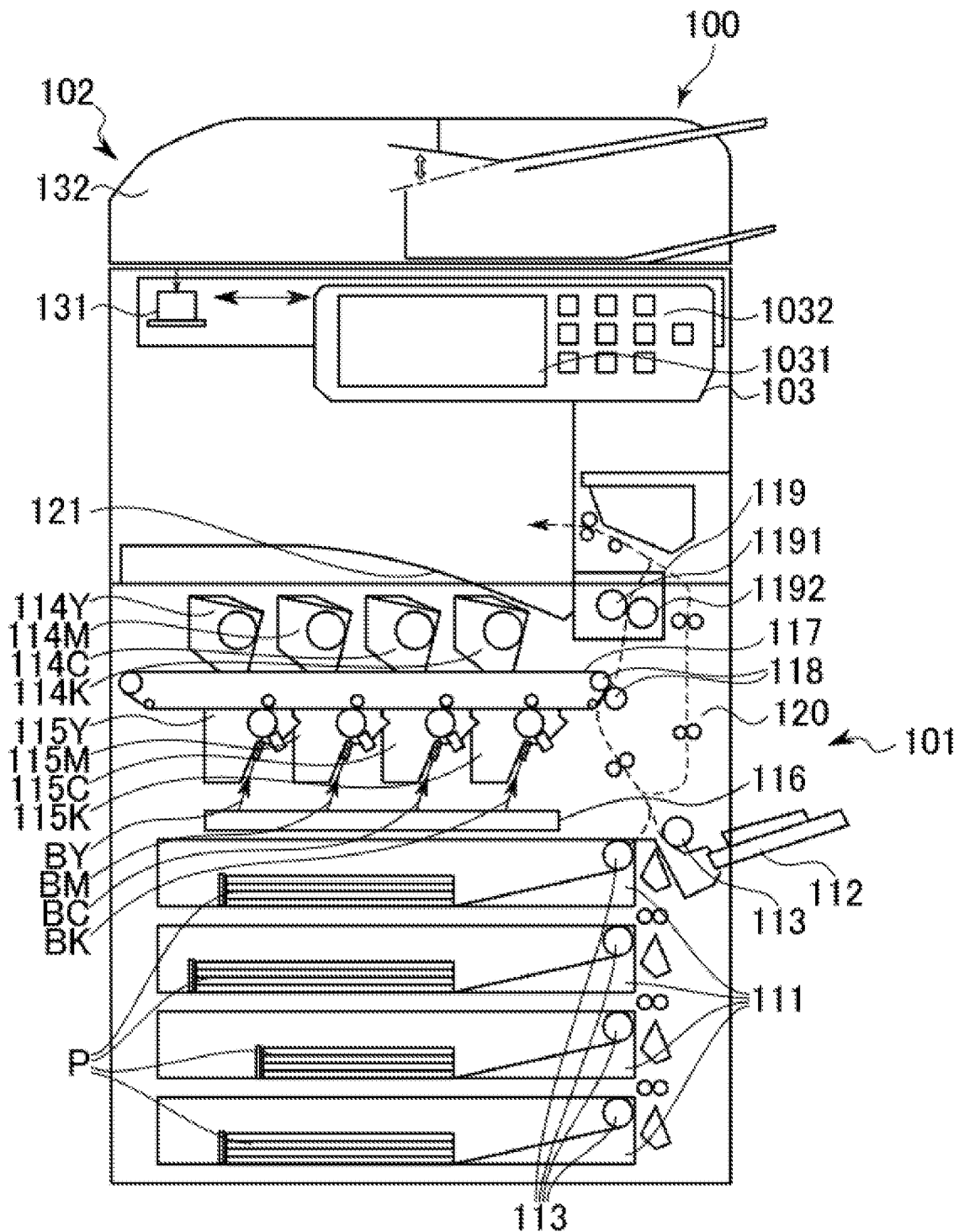
FIG. 1 is a schematic diagram of an image forming apparatus according to an embodiment.

FIG. 1 is a schematic diagram of an image forming apparatus 100 according to an embodiment. The image forming apparatus 100 is, for example, an MFP (multi-function peripheral), a copier, a printer, a facsimile, or the like. In this disclosure, the image forming apparatus 100 is described as an MFP, but is not limited to this. The image forming apparatus 100 has, for example, a printing function, a scanning function, a copying function, a decoloring function, a facsimile function, and the like. The printing function is a function of forming an image on an image forming medium P or the like by using a recording material such as a toner or the like. The image forming medium P is, for example, a sheet of paper or the like. The scanning function is a function of reading an image formed on a document or the like. The copy function is a function of printing an image that has been read from a document or the like using a scanning function, on the image forming medium P by using a printing function. The decoloring function is a function of decoloring an image previously formed on an image forming medium P with a decolorable material. The image forming apparatus 100 includes, for example, a printer 101, a scanner 102, and an operation panel 103.

The printer 101 is an apparatus having a printing function. The printer 101 includes, for example, a paper feed tray 111, a manual tray 112, a paper feed roller 113, a toner cartridge 114, an image forming unit 115, an optical scanning device 116, a transfer belt 117, a secondary transfer roller 118, a fixing unit 119, a duplex unit 120, and a paper discharge tray 121.

The paper feed tray 111 stores an image forming medium P used for printing. The manual tray 112 is a table for manually feeding the image forming medium P. The paper feed roller 113 is rotated by the motor to convey the image forming medium P from the paper feed tray 111 or the manual tray 112.

The toner cartridge 114 stores a recording material such as toner to be supplied to the image forming unit 115. The image forming apparatus 100 may include a plurality of toner cartridges 114. As shown in FIG. 1, the image forming apparatus 100 includes four toner cartridges 114C, 114M, 114Y, and 114K. Each of the toner cartridges 114C, 114M, 114Y, and 114K stores a recording material corresponding to each color, cyan (C), magenta (M), yellow (Y), and black (K). That is, the toner cartridge 114C stores a cyan (C) recording material. The toner cartridge 114M stores a magenta (M) recording material. The toner cartridge 114Y stores a yellow (Y) recording material. The toner cartridge 114K stores a black (K) recording material. The color of the recording material stored in the toner cartridge 114 is not limited to those colors CMYK, and may be other colors. Further, the recording material stored in the toner cartridge 114 may be a special purpose recording material. For example, the toner cartridge 114 can store a decolorable recording material which can be decolored at a predetermined temperature.

The image forming apparatus 100 includes a plurality of image forming units 115. As an example, as shown in FIG. 1, the image forming apparatus 100 includes four image forming units 115C, 115M, 115Y, and 115K. The image forming units 115C, 115M, 115Y, and 115K form images with recording materials having CMYK colors. That is, the image forming unit 115C forms an image of cyan color. The image forming unit 115M forms a magenta image. The image forming unit 115Y forms a yellow image. The image forming unit 115K forms a black image.

Figure 2:
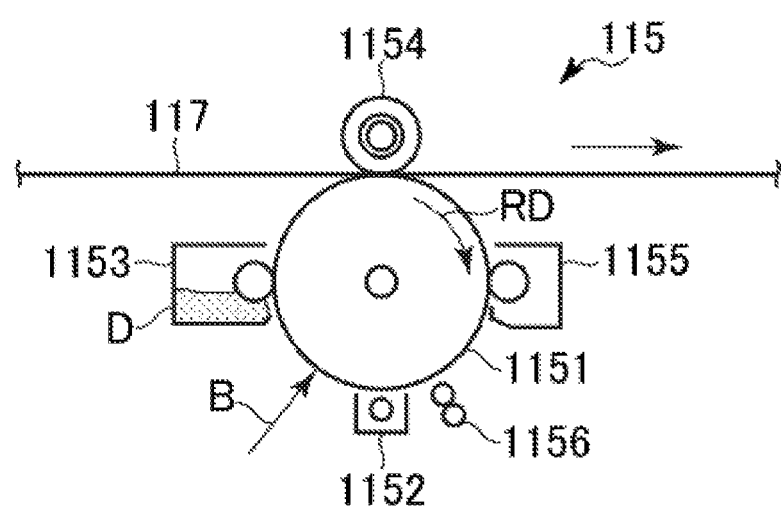
FIG. 2 is a schematic diagram of an image forming unit.

The image forming unit 115 will be further described with reference to FIG. 2. FIG. 2 is a schematic diagram of the image forming unit 115. The image forming unit 115 includes, for example, a photosensitive drum 1151, a charging unit 1152, a developing unit 1153, a primary transfer roller 1154, a cleaner 1155, and a charge removing lamp 1156.

The photosensitive drum 1151 is irradiated by a beam B emitted from the optical scanning device 116. Thus, an electrostatic latent image is formed on the surface of the photosensitive drum 1151. The charging unit 1152 charges the surface of the photosensitive drum 1151 with a positive electric charge.

The developing unit 1153 develops the electrostatic latent image on the surface of the photosensitive drum 1151 by using the recording material D supplied from the toner cartridge 114. As a result, an image formed by the recording material D is formed on the surface of the photosensitive drum 1151.

The primary transfer roller 1154 is disposed at a position opposed to the photosensitive drum 1151 with the transfer belt 117 interposed therebetween. The primary transfer roller 1154 generates a transfer voltage with respect to the photosensitive drum 1151. As a result, the primary transfer roller 1154 transfers the image formed on the surface of the photosensitive drum 1151 onto the transfer belt 117 which is in contact with the photosensitive drum 1151 (primary transfer).

The cleaner 1155 removes the recording material D remaining on the surface of the photosensitive drum 1151. The charge removing lamp 1156 removes electric charge remaining on the surface of the photosensitive drum 1151.

The optical scanning device 116 is also referred to as a laser scanning unit (LSU) in some contexts. Based on the input image data, the optical scanning device 116 controls the beam B to form an electrostatic latent image on the surface of the photosensitive drum 1151 of each image forming unit 115. The input image data is, for example, image data that has been read from a document or the like by the scanner 102. Alternatively, the input image data is image data transmitted from another apparatus or the like and received by the image forming apparatus 100.

The beams B emitted from the optical scanning device 116 to the image forming units 115Y, 115M, 115C, and 115K are referred to as beams BY, BM, BC, and BK, respectively. Accordingly, the optical scanning device 116 controls the beams BY, BM, BC, and BK in accordance with the Y (yellow), M (magenta), C (cyan), and K (black) components of the image data, respectively. The optical scanning device 116 will be further described later.

The transfer belt 117 is an endless belt, for example, and can be rotated by a roller. The transfer belt 117 is rotated to convey the image transferred from the image forming portions 115 to the secondary transfer roller 118.

Referring back to FIG. 1, the secondary transfer roller 118 includes two rollers opposed to each other. The secondary transfer roller 118 transfers the image formed on the transfer belt 117 onto the image forming medium P passing between the two rollers (secondary transfer).

The fixing unit 119 heats and presses the image forming medium P on which the image has been transferred. Thus, the image transferred onto the image forming medium P is fixed. The fixing unit 119 includes a heating unit 1191 and a pressing roller 1192 which are opposed to each other.

The heating unit 1191 is, for example, a roller including a heat source. The heat source may be, for example, a heater. The roller heated by the heat source heats the imaging forming medium P.

Alternatively, the heating unit 1191 may include an endless belt rotated by a plurality of rollers. For example, the heating unit 1191 includes a plate-like heat source, an endless belt, a belt transport roller, a tension roller, and a press roller. The endless belt is, for example, a film-like member. The belt conveying roller drives the endless belt. The tension roller applies tension to the endless belt. The press roller has an elastic layer formed on a surface thereof. The plate-like heat source is pressed against the inner side of the endless belt (i.e., in the direction of the press roller) to form a fixing nip with a predetermined width between the press roller and the plate-like heat source. Since the plate-like heat source is heated while forming the nip region, the thermal responsiveness at the time of energization is higher than that in the case of a heating method using the halogen lamp.

The pressing roller 1192 presses the image forming medium P passing between the pressing roller 1192 and the heating unit 1191.

The duplex unit 120 arranges the image forming medium P ready to be printed on the back side. For example, the duplex unit 120 reverses the front and back sides of the image forming medium P by a switch-back path using rollers or the like.

The paper discharge tray 121 is a tray on which a printed image forming medium P can be discharged.

The scanner 102 is a device having a scanning function. The scanner 102 uses an optical reduction method using an image sensor such as a charge-coupled device (CCD) image sensor. Alternatively, the scanner 102 adopts a contact image sensor (CIS) system using an image sensor such as a complementary metal-oxide semiconductor (CMOS) image sensor. Alternatively, the scanner 102 may use any other known method. The scanner 102 reads an image from a document or the like. The scanner 102 includes a reading module 131 and a document feeder 132.

The reading module 131 converts the incident light into a digital signal by an image sensor. Thus, the reading module 131 reads an image from the surface of the document.

The document feeder 132 is also referred to as an ADF (Auto Document Feeder), for example. The document feeder 132 conveys documents placed on a tray page by page. The conveyed documents are read by the scanner 102. The document feeder 132 may also include an additional scanner for reading an image from the back side of the document. The front side of the document is read by the scanner 102.

The operation panel 103 includes a man-machine interface which accepts an input from an operator of the image forming apparatus 100 or outputs information for the operator. The operation panel 103 includes, for example, a touch panel 1031, an input device 1032, and the like.

The touch panel 1031 is formed by stacking a display such as a liquid crystal display or an organic EL display and a pointing device for detecting a touch input. The display included in the touch panel 1031 functions as a display device for displaying a screen for notifying the operator of the image forming apparatus 100 of various kinds of information. Further, the touch panel 1031 functions as an input device for accepting a touch operation by the operator.

The input device 1032 accepts an operation by the operator of the image forming apparatus 100. The input device 1032 may be, for example, a keyboard, a keypad, a touch pad, or the like.

Figure 3:
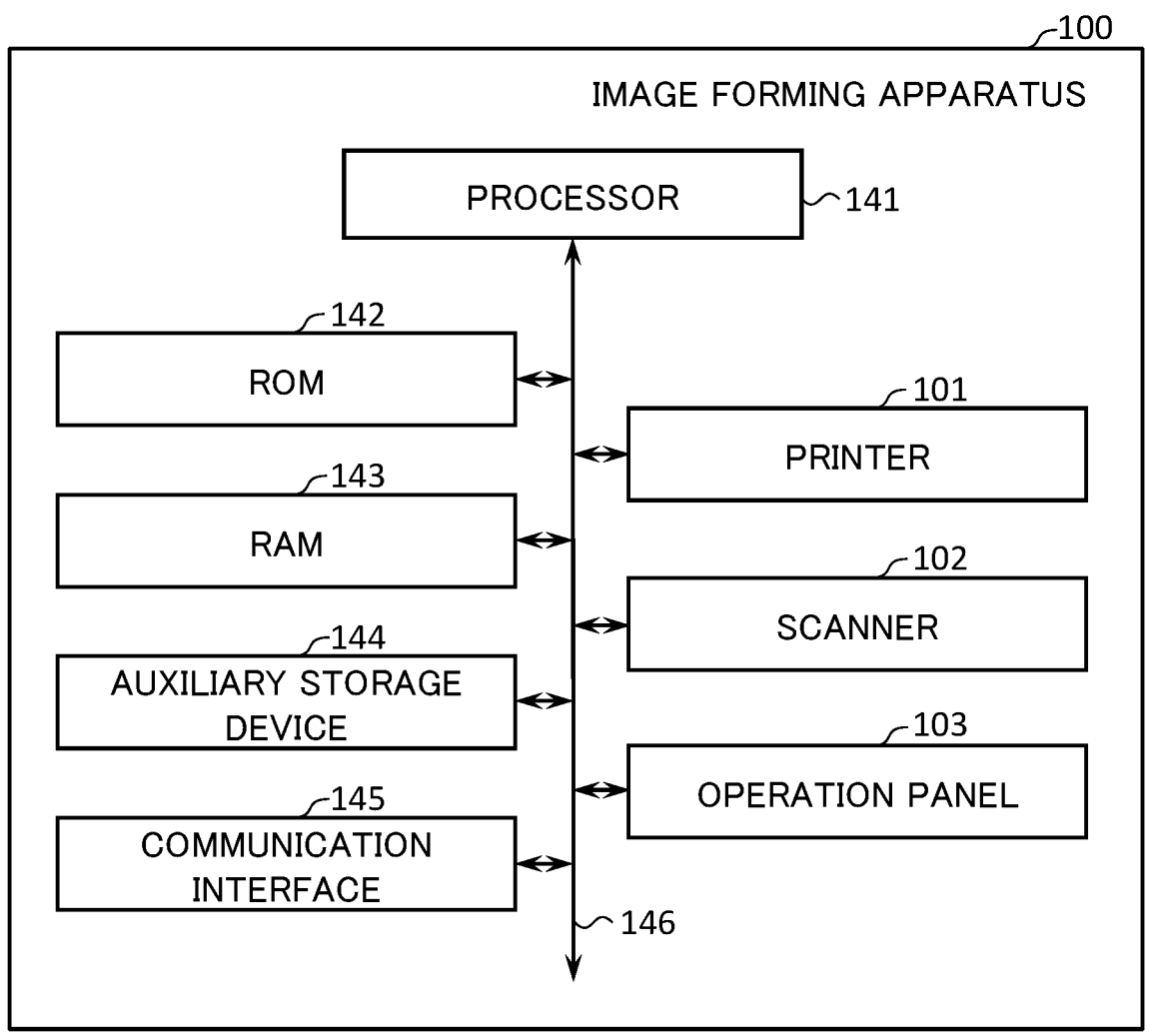
FIG. 3 is a hardware block diagram of an image forming apparatus.

Next, a hardware configuration of the image forming apparatus 100 will be described with reference to FIG. 3. FIG. 3 is a hardware block diagram of the image forming apparatus 100. The image forming apparatus 100 includes, for example, a processor 141, a read-only memory (ROM) 142, a random-access memory (RAM) 143, an auxiliary storage device 144, a communication interface 145, a printer 101, a scanner 102, and an operation panel 103. The bus 146 and the like are connected to each other.

The processor 141 performs processing such as operations and controls necessary for the operation of the image forming apparatus 100. The processor 141 controls each unit to perform various functions of the image forming apparatus 100 based on programs such as system software, application software, firmware and the like stored in the ROM 142 or the auxiliary storage device 144. The processor 141 may be, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. Alternatively, the processor 141 is any combination of those components.

The ROM 142 is a nonvolatile memory for storing data. The ROM 142 stores, for example, firmware or the like among the programs described above. The ROM 142 stores data used for the processor 141 to perform various types of processing, various setting values, and the like.

The RAM 143 is a main memory used for storing data. The RAM 143 is used as a so-called work area or the like for storing data temporarily used for the processor 141 to perform various processes. The RAM 143 is, for example, a volatile memory.

The auxiliary storage device 144 is a storage device, such as an EEPROM (electric erasable programmable read-only memory), an HDD (hard disk drive), an SSD (solid state drive), or an eMMC (embedded multimedia card). The auxiliary storage device 144 stores, for example, system software, application software, and the like, among the programs described above. The auxiliary storage device 144 stores data used by the processor 141 to perform various processes, data generated by processing performed by the processor 141, various setting values, and the like. Note that the image forming apparatus 100 may include an interface connectable to a memory card or a storage medium such as a universal serial bus (USB) memory as the auxiliary storage device 144. The interface reads and writes information to and from the storage medium.

The communication interface 145 is an interface for the image forming apparatus 100 to communicate via a network or the like.

The bus 146 includes a control bus, an address bus, a data bus, and the like, and transmits signals transmitted and received by the respective components of the image forming apparatus 100.

Figure 4:
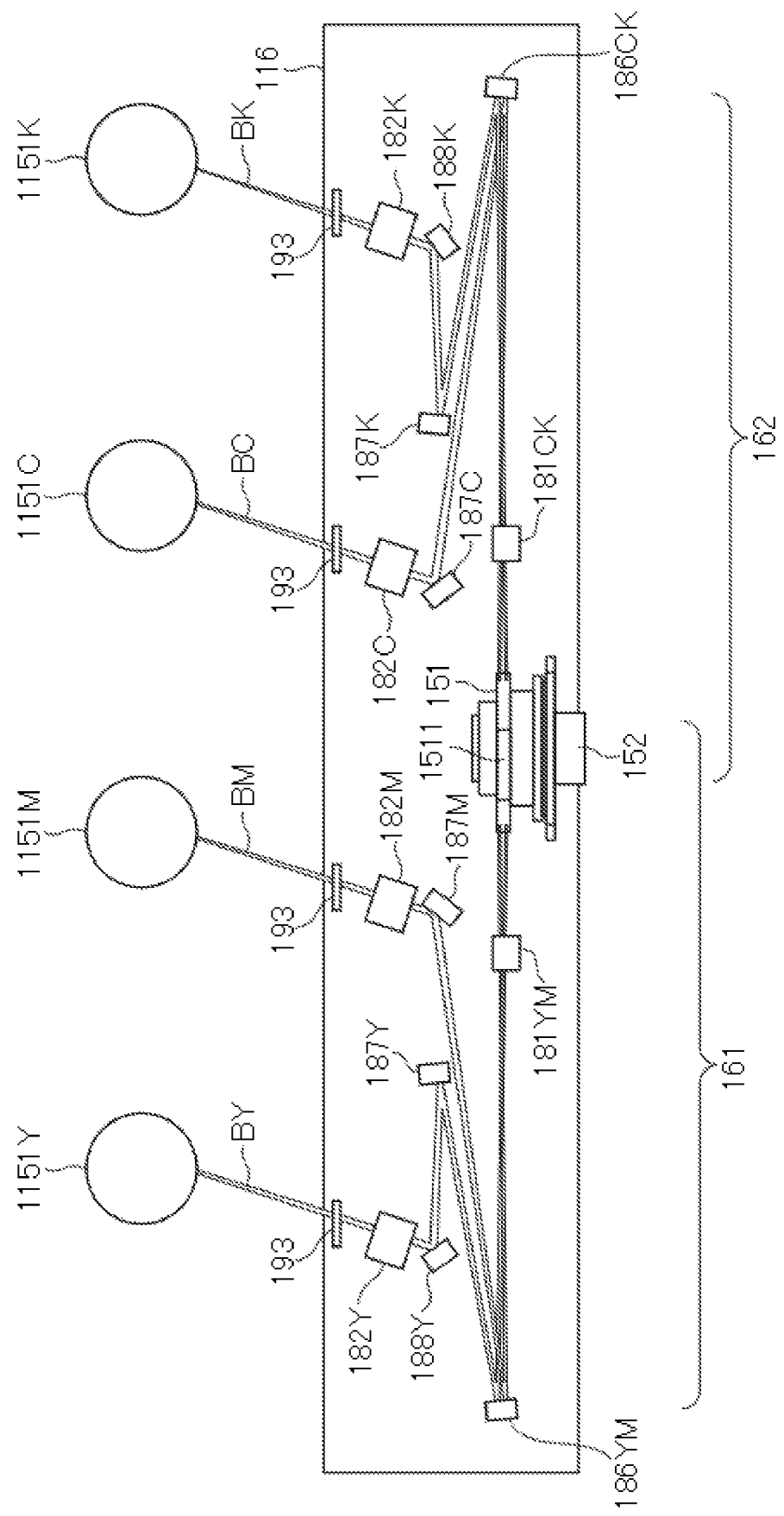
FIG. 4 is a diagram of an optical scanning device.
Figure 5:
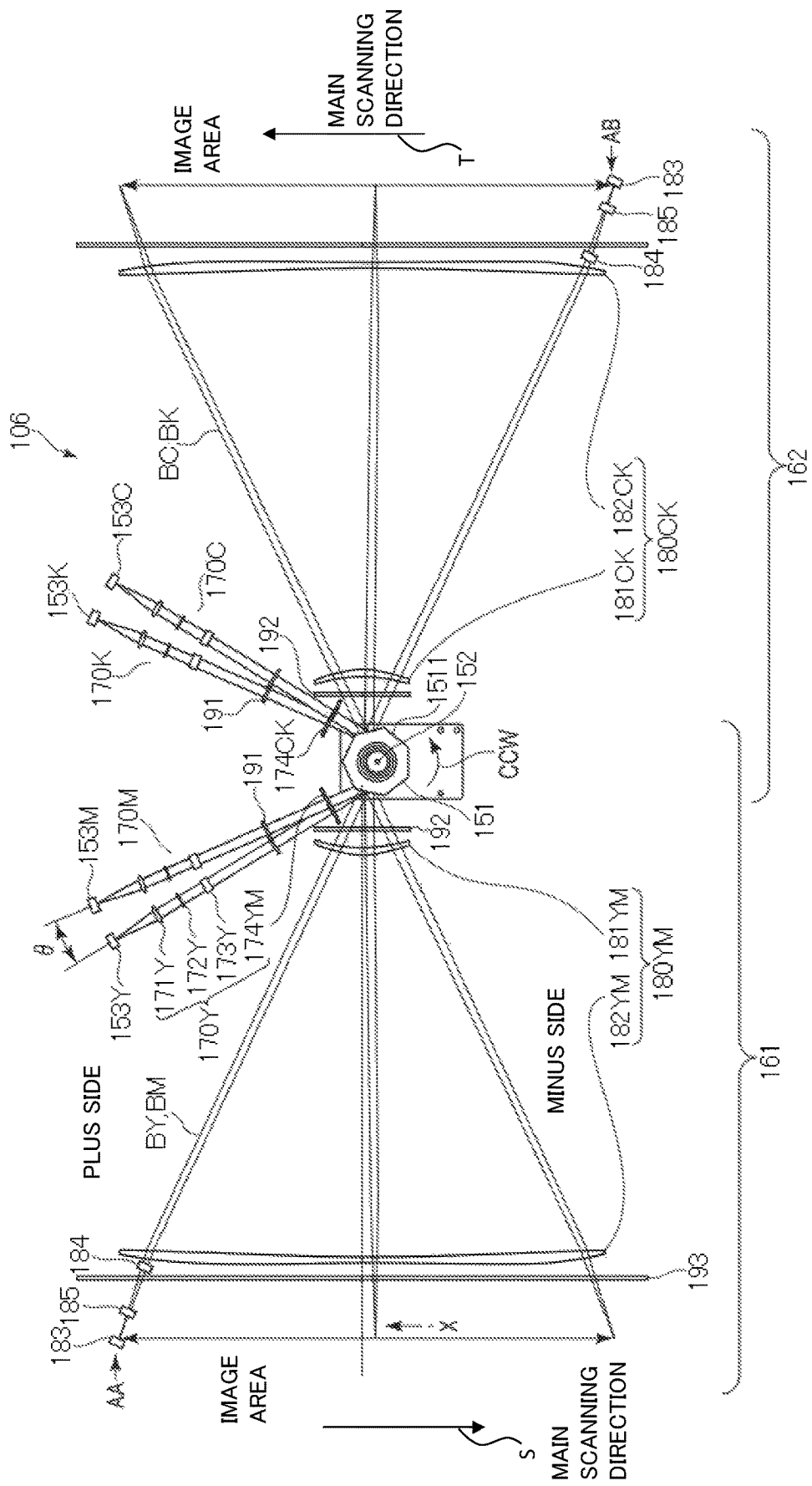
FIG. 5 is a diagram of a pre-deflection optical system of an optical scanning device.
Figure 6:
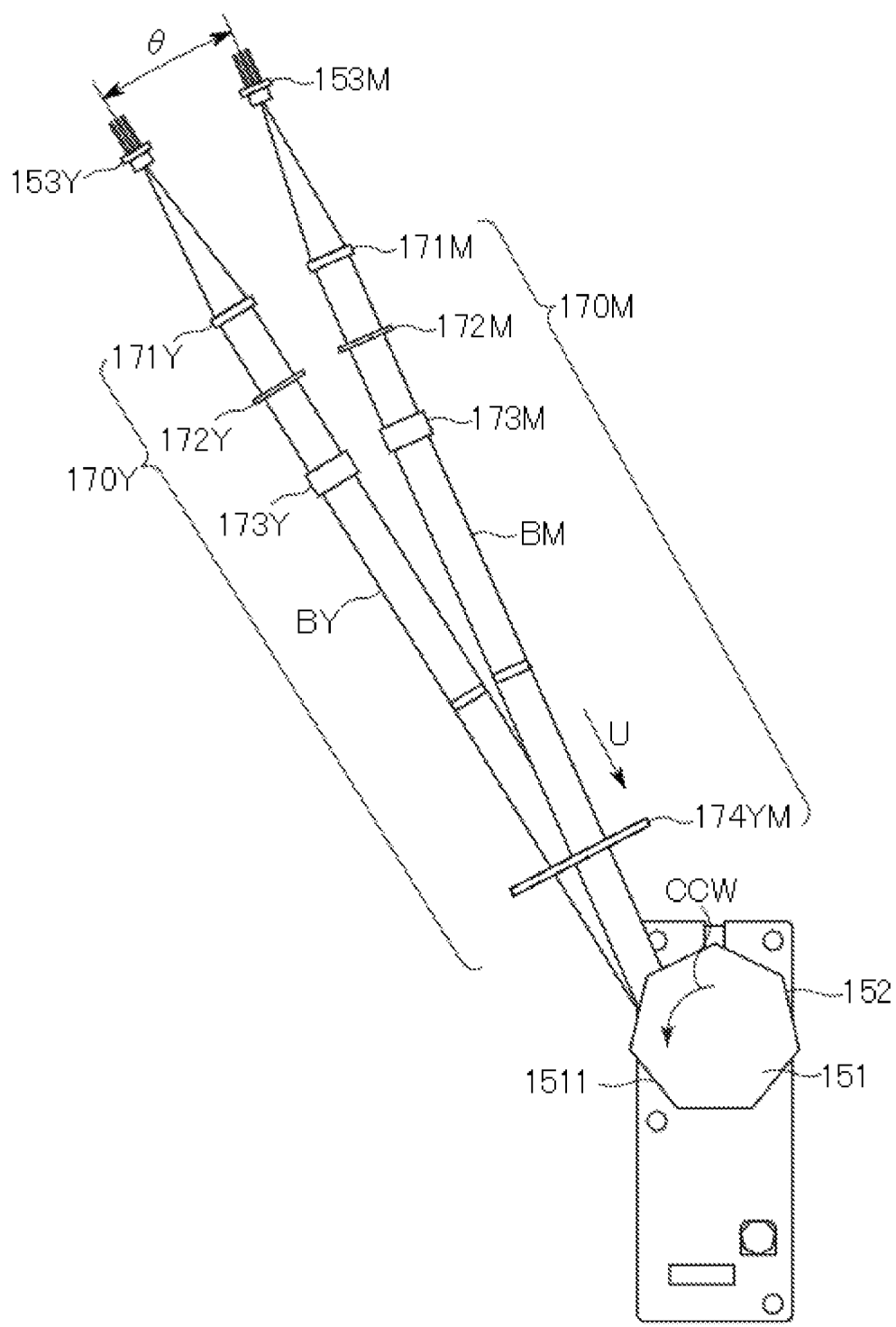
FIG. 6 is a partially enlarged view of an optical scanning device.
Figure 7:
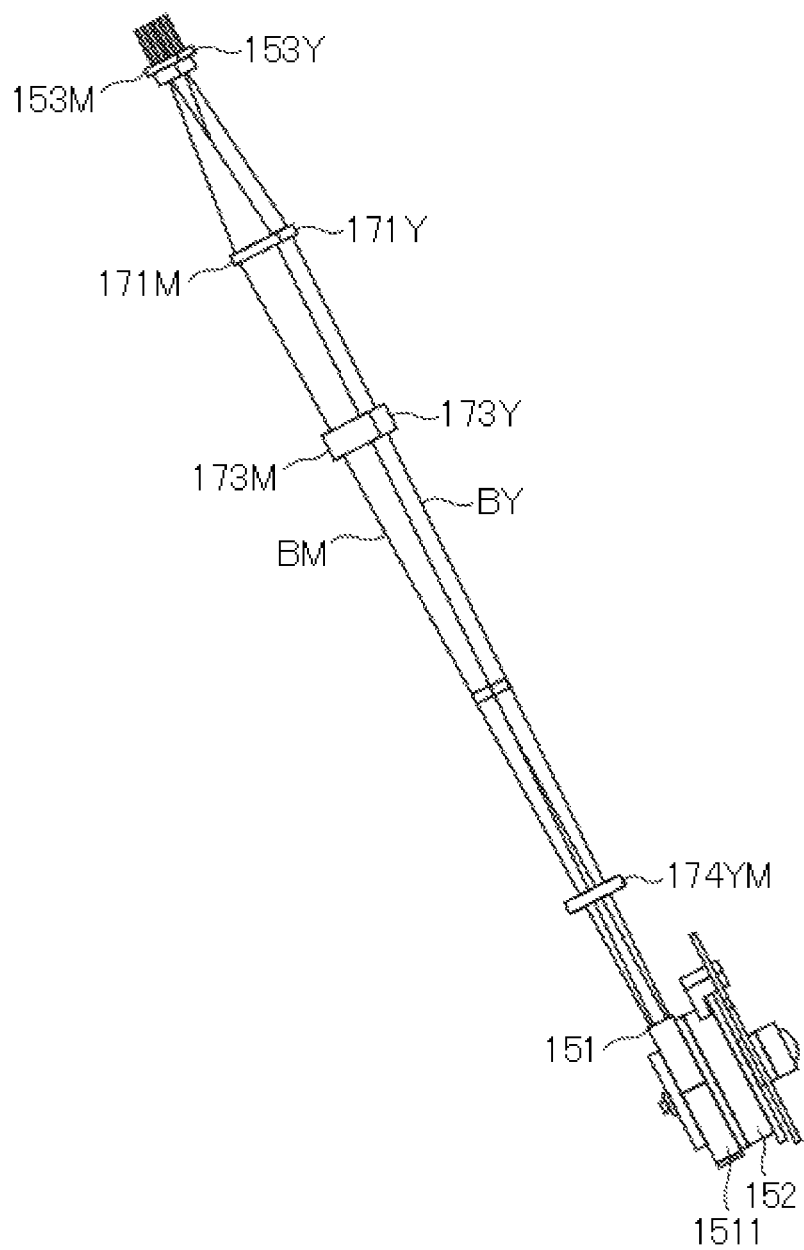
FIG. 7 is a side view of an optical scanning device.

The optical scanning device 116 will be further described below with reference to FIG. 4 to FIG. 7. FIG. 4 is a diagram of the optical scanning device 116. FIG. 5 is a diagram of a pre-deflection optical system of the optical scanning device 116. FIG. 6 is a partially enlarged view of the optical scanning device 116 shown in FIG. 5. FIG. 7 is a side view of the optical scanning device 116 shown in FIG. 6. The optical scanning device 116 includes, for example, a polygon mirror 151, a motor 152, a light source 153, and a plurality of optical elements.

The polygon mirror 151 is a mirror or a deflector having a regular polygonal prism shape, which is a reflection surface 1511 on which each side surface reflects a laser beam. The polygon mirror 151 shown in FIG. 4 to FIG. 7 is a mirror having a regular heptagonal prism shape including seven side surfaces (i.e., reflecting surfaces 1511). The reflection surfaces 1511 provided on the polygon mirror 151 are connected along the rotation direction CCW (i.e., counterclockwise direction in FIG. 5) of the polygon mirror 151 and make up an outer peripheral surface of the polygon mirror 151. The polygon mirror 151 is rotatable around a rotation axis parallel to the reflection surface 1511. The rotational axis of the polygon mirror 151 is orthogonal to the rotation axis of each photosensitive drum 1151. Here, the page plane of FIG. 6 is perpendicular to the rotation axis of the polygon mirror 151. That is, the rotation axis of the polygon mirror 151 is normal to (extends out of) the page of FIG. 6.

For example, the optical scanning device 116 includes, in addition to the polygon mirror 151 having a regular seven prism shape shown in FIG. 4 to FIG. 7, a polygon mirror 151 having a regular octagonal prism shape with eight reflective surfaces 1511. The optical scanning device 116 may have a polygon mirror 151 having six or less or nine or more surfaces. For example, all of the polygon mirrors 151 attached to the optical scanning device 116 have the same inscribed circle radius and are rotatable about the same rotation axis. By using the polygon mirror 151 having the same inscribed circle radius and the same rotation axis, it is possible to reflect the beam B on the same surface without changing the optical path length of the beam B regardless of the number of surfaces of the polygon mirror, thereby suppressing the variation in focal position in the image plane.

To distinguish the polygon mirrors 151 having different number of surfaces, the polygon mirror 151 having seven surface is referred to as the polygon mirror 151-7, and the polygon mirror 151 having eight surfaces is referred to as the polygon mirror 151-8.

The motor 152 rotates the polygon mirror 151 at a particular speed in the rotation direction CCW. The rotation axis of the motor 152 and the rotation axis of the polygon mirror 151 are identical. However, the rotation axis of the motor 152 and the rotation axis of the polygon mirror 151 do not necessarily have to be identical.

The light source 153 emits a beam B such as a laser beam. The light source 153 includes, for example, a plurality of laser diodes. That is, the beam B is a multi-beam composed of beams emitted from a plurality of laser diodes. The plurality of laser diodes are separated from the polygon mirror 151 by a particular distance in the main scanning direction. Therefore, each beam included in the beam B travels the particular distance in the main scanning direction before reaching the polygon mirror 151. As an example, the optical scanning device 116 includes four light sources 153C, 153M, 153Y, and 153K. For example, the light source 153Y emits the beam BY corresponding to the Y component, the light source 153M emits the beam BM corresponding to the M component, the light source 153C emits the beam BC corresponding to the C component, and the light source 153K emits the beam BK corresponding to the K component.

The optical scanning device 116 irradiates the surface of each photosensitive drum 1151 with each of the beams B that travels along an optical path formed by a predetermined scanning optical system. The scanning optical system includes a plurality of optical elements. As an example, as shown in FIGS. 4 and 5, the optical scanning device 116 includes a set of two scanning optical systems disposed on the left and right sides of the polygon mirror 151 so as to emit a set of two beams B. That is, as shown in FIGS. 4 and 5, the optical scanning device 116 includes two scanning optical systems 161 and 162 each including a plurality of optical elements on both sides of a single polygon mirror 151 (i.e., left and right sides in FIGS. 4 and 5). The polygon mirror 151 is included in both the scanning optical systems 161 and 162. That is, the same polygon mirror 151 is shared by the scanning optical systems 161 and 162.

The scanning optical system 161 on the left side in the figure includes a scanning optical system for scanning the beam BY and a scanning optical system for scanning the beam BM. The scanning optical system 161 reflects the beam BY emitted from the light source 153Y and the beam BM emitted from the light source 153M by the same reflection surface 1511 of the polygon mirror 151 rotating in the rotation direction CCW. Accordingly, the beam BY and the beam BM are deflected in the main scanning direction along the rotation direction CCW, and the surfaces of the two photosensitive drums 1151Y and 1151M are scanned. The scanning optical system 161 includes the polygon mirror 151, the light source 153Y, the light source 153M, a pre-deflection optical system 170Y, a pre-deflection optical system 170M, and a post-deflection optical system 180YM. The pre-deflection optical system 170Y is an optical system for guiding the beam BY. Further, the pre-deflection optical system 170M is an optical system for guiding the beam BM. Further, the post-deflection optical system 180YM is an optical system for guiding the beams BY and BM.

Here, the direction in which each beam B is deflected or scanned by the polygon mirror 151 serving as a deflector is defined as the "main scanning direction". In addition, the direction orthogonal to the main scanning direction is defined as the "sub scanning direction" of the beam B. In FIGS. 5 and 6, the rotational axis direction of the polygon mirror 151 is the sub scanning direction.

The scanning optical system 162 shown in the right side of the figure includes a scanning optical system for scanning the beam BC and a scanning optical system for scanning the beam BK. The scanning optical system 162 reflects the beam BC emitted from the light source 153C and the BK emitted from the light source 153K by the same reflection surface 1511 of the polygon mirror 151 rotating in the rotation direction CCW. Accordingly, the beam BC and the beam BK are deflected in the main scanning direction along the rotation direction CCW, and the surfaces of the two photosensitive drums 1151C and 1151K are scanned. The scanning optical system 162 includes the polygon mirror 151, the light source 153C, the light source 153K, a pre-deflection optical system 170C, a pre-deflection optical system 170K, and a post-deflection optical system 180CK.

Here, the polygon mirror 151, the light source 153, and the pre-deflection optical system 170 will be further described with reference to the scanning optical system 161 shown in the left side of the drawing. The polygon mirror 151 rotates while reflecting the two beams BY and BM emitted from the light sources 153Y and 153M by the same reflection surface 1511. Thus, two image surfaces arranged at predetermined positions, i.e., the surfaces of the photosensitive drums 1151Y and 1151M, are scanned in the main scanning direction (i.e., the direction of rotation axis of the photosensitive drum 1151) at a predetermined linear velocity. At the same time, the image forming apparatus 100 rotates the photosensitive drums 1151Y and 1151M in the sub scanning direction. Thus, an electrostatic latent image corresponding to the Y component is formed on the surface of the photosensitive drum 1151Y, and an electrostatic latent image corresponding to the M component is formed on the surface of the photosensitive drum 1151M.

As shown in FIGS. 5 and 6, the light sources 153Y and 153M of the scanning optical system 161 are disposed at different angular positions with respect to the surfaces of the polygon mirror 151 when viewed from the front side in the drawings. That is, the two light sources 153Y and 153M are arranged such that the beams BY and BM incident on the reflection surface 1511 form an angle θ. In other words, the two light sources 153Y and 153M are arranged such that the beams BY and BM form an opening angle θ in the main scanning direction. The light source 153Y of the two light sources 153 is located closer to the scanning surface than the light source 153M.

As shown in FIG. 7, the two light sources 153Y and 153M are slightly shifted in the sub scanning direction. The light source 153M is positioned at a higher position than the light source 153Y. That is, the light source 153M is located closer to the front side of FIGS. 5 and 6 than the light source 153Y. The optical axis of the pre-deflection optical systems 170Y and 170M (i.e., the light propagation direction) are orthogonal to the rotation axis 151b of the polygon mirror 151. Therefore, the beams BY and BM emitted from the light sources 153Y and 153M are incident on the same reflection surface 1511 at positions slightly shifted in the sub scanning direction.

The scanning optical system 161 includes the pre-deflection optical system 170 in each of the optical paths between the light sources 153 and the polygon mirror 151. That is, the scanning optical system 161 includes two pre-deflection optical systems 170Y and 170M. The pre-deflection optical system 170Y is disposed on an optical path between the light source 153Y and the polygon mirror 151. The pre-deflection optical system 170M is disposed on an optical path between the light source 153M and the polygon mirror 151. Each of the pre-deflection optical systems 170 includes a collimator lens 171, a sub scanning diaphragm 172, a cylinder lens 173, and a main scanning diaphragm 174. Specifically, the pre-deflection optical system 170Y includes a collimator lens 171Y, a sub scanning diaphragm 172Y, a cylinder lens 173Y, and a main scanning diaphragm 174YM. The pre-deflection optical system 170M includes a collimator lens 171M, a sub scanning diaphragm 172M, a cylinder lens 173M, and the main scanning diaphragm 174YM. The pre-deflection optical systems 170Y and 170M share the same main scanning diaphragm 174YM.

The collimator lens 171 converges and collimates the beam B emitted from the light source 153.

The sub scanning diaphragm 172 shapes the beam B that has passed through the collimator lens 171. For example, the sub scanning diaphragm 172 narrows the width of the beam B in the sub scanning direction to a predetermined width.

The cylinder lens 173 converges the beam B that has passed through the sub scanning diaphragm 172 in the sub scanning direction. Accordingly, the width in the sub scanning direction of the beam B passing through the cylinder lens 173 becomes narrower as it approaches the reflection surface 1511. Therefore, a plurality of beams B can be incident on positions of the reflection surface 1511 shifted in the sub scanning direction so as not to overlap with each other.

The main scanning diaphragm 174 shapes the beam B that has passed through the cylinder lens 173 in the main scanning direction. For example, the sub scanning diaphragm 172 narrows the width of the beam B in the main scanning direction to a predetermined width. The main scanning diaphragm 174 will be further described later.

Further, the polygon mirror 151, the light source 153, and the pre-deflection optical system 170 of the scanning optical system 162 shown on the right side of FIG. 5 are described. The polygon mirror 151 rotates while reflecting the two beams BC and BK emitted from the light sources 153C and 153K at the same reflection surface 1511. Thus, two image planes (i.e., the surfaces of the corresponding photosensitive drums 1151C and 1151K) are scanned in the main scanning direction (i.e., the rotational axis direction of the photosensitive drum 1151) at a predetermined linear velocity. At the same time, the image forming apparatus 100 rotates the photosensitive drums 1151C and 1151K in the sub scanning direction. Accordingly, an electrostatic latent image corresponding to the component C is formed on the surface of the photosensitive drum 1151C, and an electrostatic latent image corresponding to the K component is formed on the surface of the photosensitive drum 1151K.

The two light sources 153C and 153K of the scanning optical system 162 are disposed at different angular positions with respect to the surfaces of the polygon mirror 151 when viewed from the front side in FIG. 5, similarly to the light sources 153Y and 153M of the scanning optical system 161 described above. That is, the two light sources 153C and 153K are arranged such that the beams BC and BK incident on the reflection surface 1511 form an opening angle θ. In other words, the two light sources 153C and 153K are arranged such that the beams BC and BK form an opening angle θ in the main scanning direction. The light source 153C of the two light sources is located closer to the scanning surface than the light source 153K.

Further, the light sources 153C and 153K are slightly shifted from each other in the sub scanning direction. The light source 153C is positioned at a higher level than the light source 153K. Therefore, the beams BC and BK emitted from the light sources 153C and 153K are incident on the same reflection surface 1511 at slightly shifted positions in the sub scanning direction.

The scanning optical system 162 includes the pre-deflection optical system 170 in each of the optical paths between the light source 153 and the polygon mirror 151. That is, the scanning optical system 162 includes two pre-deflection optical systems 170C and 170K. The pre-deflection optical system 170C is disposed on an optical path between the light source 153C and the polygon mirror 151. The pre-deflection optical system 170K is disposed on an optical path between the light source 153K and the polygon mirror 151. Specifically, the pre-deflection optical system 170C includes a collimator lens 171C, a sub scanning diaphragm 172C, a cylinder lens 173C, and a main scanning diaphragm 174CK. The pre-deflection optical system 170K includes a collimator lens 171K, a sub scanning diaphragm 172K, a cylinder lens 173K, and the main scanning diaphragm 174CK. The pre-deflection optical systems 170C and 170K share the same main scanning diaphragm 174CK. As described above, the scanning optical system 162 includes the similar elements as those of the scanning optical system 161.

Next, the post-deflection optical system 180 will be described. The post-deflection optical system 180 guides the beam B reflected by the reflection surface 1511 to the surface of the photosensitive drum 1151. The optical scanning device 116 includes two post-deflection optical systems 180YM and 180CK. The post-deflection optical system 180 includes an fθ lens 181, an fθ lens 182, a photodetector 183, a reflection mirror 184, an optical path correction element 185, and reflection mirrors 186-188.

The fθ lens 181 and the fθ lens 182 are two sets of imaging lenses that optimize the shape and position on the image plane of the beam B deflected or scanned by the polygon mirror 151.

The fθ lens 181 is provided for one of the post-deflection optical systems 180 near the polygon mirror 151. That is, the fθ lens 181 is located on the optical paths of one set of two beams B. For example, the fθ lens 181YM is located on the optical paths on the beams BY and BM.

In FIG. 5, the fθ lens 182 is illustrated to be provided on the downstream side of the fθ lens 181 for each of the post-deflection optical systems 180. However, as shown in FIG. 4, the fθ lens 182 is actually provided on the optical path of each beam B. In other words, the fθ lens 182YM shown in FIG. 5 collectively shows the fθ lenses 182Y and 182M shown in FIG. 4, and the fθ lens 182CK shown in FIG. 5 collectively shows the fθ lenses 182C and 182K shown in FIG. 6. Each beam B passes through the fθ lens 182 on the corresponding optical path. The fθ lens 182 is positioned in the vicinity of a third cover glass 193, which will be described later.

The photodetector 183 is located at the end of the scanning start portion of the beam B (that is, the scanning positions AA and AB shown in FIG. 5). The photodetector 183 is provided to match horizontal synchronization of the beam B that has passed through the fθ lens 181 and the fθ lens 182.

The reflection mirror 184 is located on an optical path from the fθ lens 182 toward the photodetector 183. The reflection mirror 184 reflects the beam B to turn it back toward the photodetector 183. FIG. 5 shows the positional relationship between the optical path of the beam B and the optical detector 183, the reflection mirror 184, and the optical path correction element 185.

The optical path correction element 185 is on an optical path between the reflection mirror 184 and the photodetector 183. The optical path correction element 185 guides the beam B reflected by the reflection mirror 184 onto the detection surface of the photodetector 183.

The reflection mirrors 186-188 reflect the beam B that has passed through the fθ lens 181 toward the surfaces of the respective photosensitive drums 1151. Specifically, the optical scanning device 116 includes two reflection mirrors 186YM and 186CK, four reflection mirrors 187Y, 187M, 187C, and 187K, and two reflection mirrors 188Y and 188K. In FIG. 5, the reflecting mirrors 186 and 188 are not shown.

The optical scanning device 116 includes a first cover glass 191, a second cover glass 192, and a third cover glass 193.

The first cover glass 191 is located between the pre-deflection optical system 170 and the polygon mirror 151a. The second cover glass 192 is located between the polygon mirror 151 and the post-deflection optical system 180. The first cover glass 191 and the second cover glass 192 are provided to prevent wind noise caused by the rotation of the polygon mirror 151. The first cover glass 191 prevents the wind noise from leaking from the entrance of the beam B. The second cover glass 192 prevents leakage of the wind noise from the exit of the beam B.

The third cover glass 193 is located between the fθ lens 182 and the photosensitive drum 1151. The third cover glass 193 covers an exit from which the beam B exits in the housing of the optical scanning device 116.

As described above, the scanning optical systems 161 and 162 are arranged on the right and left sides of the polygon mirror 151 in the optical scanning device 116. Therefore, when the polygon mirror 151 is rotated in a particular direction, the scanning direction of the photosensitive drum 1151 by the scanning optical system 161 and the scanning direction of the photosensitive drum 1151 by the scanning optical system 162 are opposite to each other. In this disclosure, an upper side in FIG. 5 where the light sources 153Y, 153M, 153C, and 153K are drawn around the polygon mirror 151 is referred to as a plus side, and a lower side in FIG. 5 is referred to as a minus side. Thus, the scanning optical system 161 scans the image plane from the positive side to the negative side as indicated by the arrow S. In contrast, the scanning optical system 162 scans the image plane from the negative side to the positive side as indicated by the arrow T.

Figure 8:
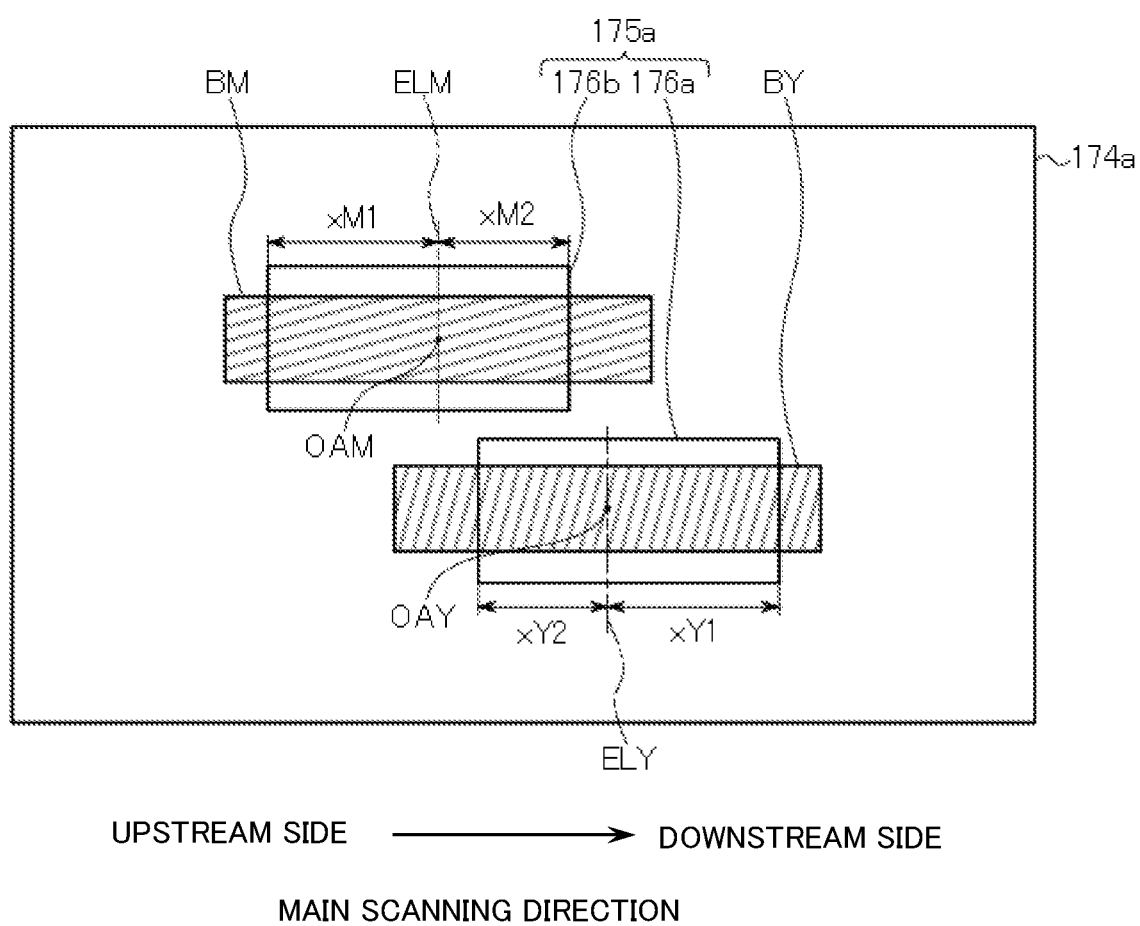
FIGS. 8 and 9 are diagrams each showing a main scanning diaphragm.
Figure 9:
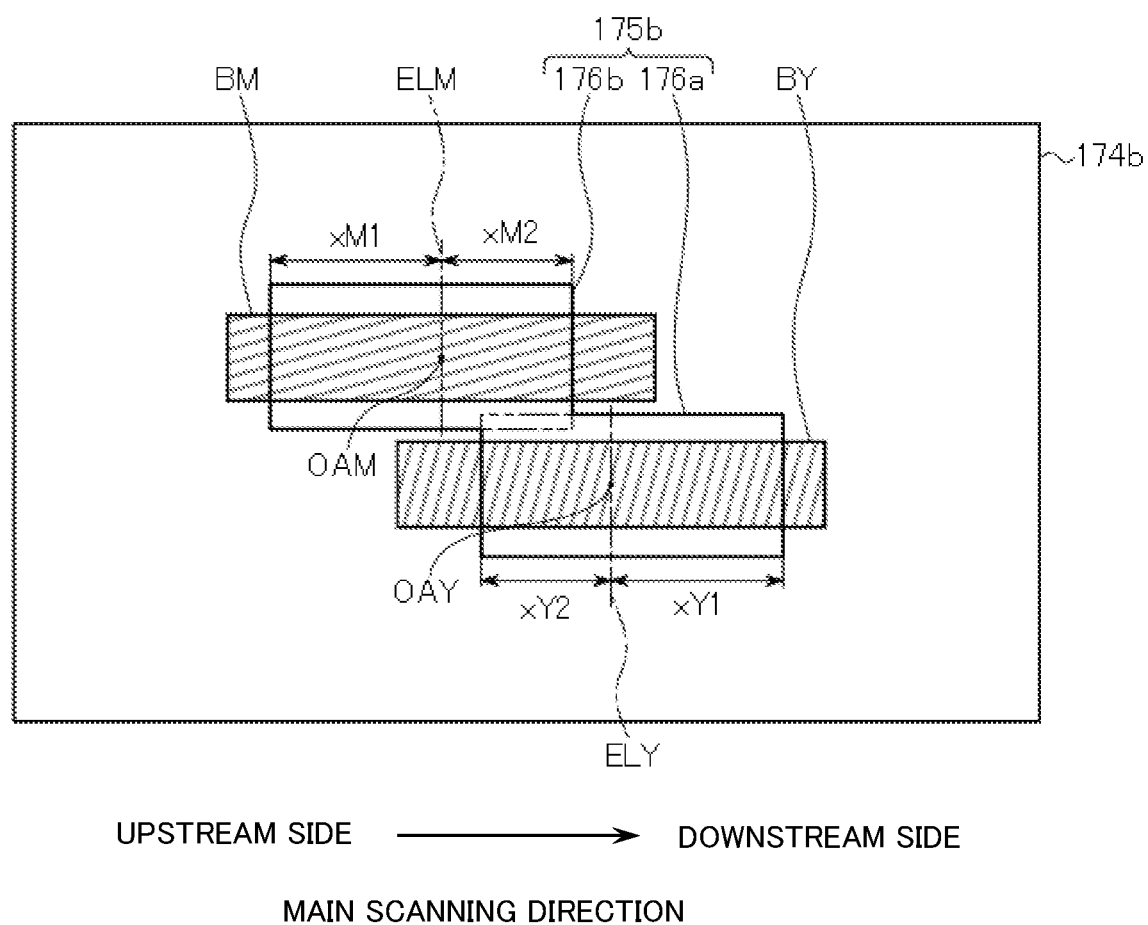

The main scanning diaphragm 174 will be described with reference to FIGS. 8 and 9. FIGS. 8 and 9 show main scanning diaphragms 174a and 174b as examples of the main scanning diaphragm 174. The main scanning diaphragm 174 shown in FIG. 8 and FIG. 9 is the main scanning diaphragm 174YM. Further, FIGS. 8 and 9 each show a plan view of the main scanning diaphragm 174 when viewed from the light source 153 (i.e., in the direction U indicated by the arrow U in FIG. 6).

The main scanning diaphragm 174 is a plate-like member. The main scanning diaphragm 174 has an opening 175. The main scanning diaphragm 174a shown in FIG. 8 has an opening 175a as an example of the opening 175. The main scanning diaphragm 174b shown in FIG. 9 has an opening 175b as an example of the opening 175. The opening 175 is composed of two openings 176a and 176b. The shape of each opening 176 is a rectangle in which the width in the sub scanning direction is larger than the width in the sub scanning direction of the beam B. The width of the opening 176 in the sub scanning direction is such a width so as not to block the side of the beam B in the sub scanning direction (that is, the upper side or the lower side of the beam B) even if the passing position of the beam B is shifted in the sub scanning direction due to component misalignment caused in manufacturing process.

FIG. 8 and FIG. 9 show the optical axis OA of the beam B incident on the opening 176. FIGS. 8 and 9 show the optical axis OA of the beam BY as an optical axis OAX and the optical axis OA of the beam BM as an optical axis OAM.

FIG. 8 and FIG. 9 show a bisector EL of the beam B having a rectangular shape, which is parallel to the sub scanning direction and passes through the optical axis OA. In FIG. 8 and FIG. 9, the bisector EL passing through the optical axis OAX is represented by ELY, and the bisector EL passing through the optical axis OAM is represented by ELM.

The opening 176a has a length xY1, which is on the downstream side of the bisector ELY in the main scanning direction and a length xY2, which is on the upstream side of the bisector ELY in the main scanning direction. The relationship between the lengths of xY1 and xY2 is xY1>xY2. The beam BY that has passed through the opening 176a has the length xY2 from the optical axis OAY to an end of the beam BY on the upstream side, and the length xY1 from the optical axis OAY to the other end of the beam BY on the downstream side. Therefore, the opening 176a functions as a diaphragm that shapes the beam BY.

The opening 176b has a length of xM1, which is on the upstream side of a bisector ELM in the main scanning direction and a length of xM2, which is on the downstream side of the bisector ELM in the main scanning direction. The relationship between the lengths of xM1 and xM2 is xM1>xM2. The beam BM that has passed through the opening 176b has the length xM1 from the optical axis OAM to an end of the beam BM on the upstream side, and the length xM2 from the optical axis OAM to the other end of the beam BM on the downstream side. Therefore, the opening 176b functions as a diaphragm for shaping the beam BM.

The opening 176a shown in FIG. 8 does not overlap with the opening 176b. Therefore, the opening 175a is composed of two openings 176a and 176b which are not connected to each other.

The opening 175b shown in FIG. 9 includes openings 176a and 176b overlapped with each other. That is, the opening 175b is composed of two openings 176a and 176b connected to each other.

As described above, in the optical scanning device 116, since the beams BM and BY are shifted in the sub scanning direction, the beams BM and BY in the main scanning direction can be shaped into a desired shape by a single main scanning diaphragm 174.

Further, as shown in FIG. 8, when the beams BM and BY are sufficiently separated from each other in the sub scanning direction, the openings 176a and 176b can be separately arranged so as not to overlap each other. In contrast, as shown in FIG. 9, when the distance between the beams BM and BY in the sub scanning direction is small, the openings 176a and 176b overlap each other. Note that the width of the polygon mirror 151 in the sub scanning direction must be larger as the beams BM and BY are separated farther in the sub scanning direction. The smaller the width in the sub scanning direction of the polygon mirror 151 is, the smaller the size of the optical scanning device 116 can be achieved. Further, the smaller the width in the sub scanning direction of the polygon mirror 151, the shorter the time required for stable rotation at a specified rotation speed from the start of rotation. Further, it is possible to shorten the time required for stopping the rotation of the polygon mirror 151 by reducing the width of the polygon mirror 151 in the sub scanning direction.

Figure 10:
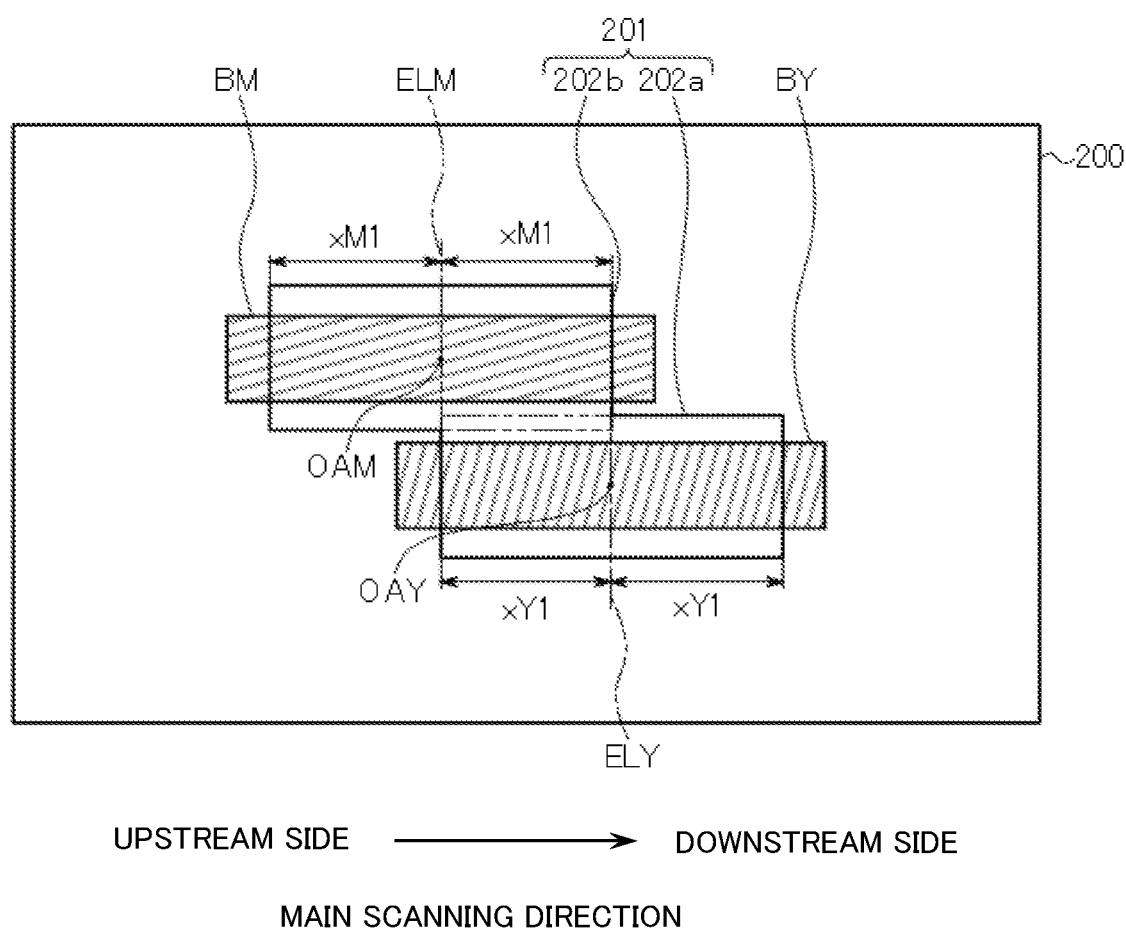
FIG. 10 is a diagram showing a comparative example of a main scanning diaphragm.

With reference to FIG. 10, a main scanning diaphragm 200 used as a comparison target of the main scanning diaphragm 174 will be described with reference to FIG. 10. The main scanning diaphragm 200 shown in FIG. 10 is a main scanning diaphragm 200YM through which the beams BY and BM passes similarly to the main scanning diaphragm 174YM. The main scanning diaphragm 200 has an opening 201 instead of the opening 175 of the main scanning diaphragm 174. The opening 201 has two openings 202a and 202b instead of the openings 176a and 176b. The length of each of the openings 202a and 202b from the bisector ELY or ELM to an end of the beam on the upstream side is identical with the length of the opening from the bisector to the other end of the beam on the downstream side. For example, the length of the opening 202a between the bisector ELY and the end of the beam is xY1, and the length of the opening 202b between the bisector ELM and the end of the beam is xM1.

Further, it is preferable that the main scanning diaphragm 174 is closer to the polygon mirror 151. As mentioned above, the beam B is a multi-beam consisting of a plurality of beams. Each beam included in the beam B travels a particular distance in the main scanning direction. Therefore, each beam included in the beam B that has passed through the main scanning diaphragm 174 tends to spread in the main scanning direction as it moves away from the main scanning diaphragm 174. When each beam contained in the beam B is spread in the main scanning direction, it becomes easy for each beam to deviate from its desired optical path. When the beams deviate from the desired optical paths, vignetting tends to occur when the beams are reflected by the polygon mirror 151, or the positions where the beams are focused on each other tend to be different from each other, thereby causing deterioration in image quality. Accordingly, when the main scanning diaphragm 174 is closer to the polygon mirror 151, the image quality of the image forming apparatus 100 is more improved, because the image surface field curvature is reduced. Therefore, in the aforementioned embodiments, the main scanning diaphragm 174 is located between the cylinder lens 173 and the polygon mirror 151, thereby improving the image quality of the image forming apparatus 100. However, as the main scanning diaphragm 174 approaches the polygon mirror 151, the beams BY and BM overlap each other in the main scanning direction. Therefore, it becomes difficult to individually arrange a diaphragm for each of the beams B like the sub scanning diaphragm 172. In the embodiments, by allowing the two beams BY and BM to pass through one main scanning diaphragms 174, it is possible to shape the beams in the main scanning direction in the vicinity of the polygon mirror 151. Conventional optical scanning apparatuses has two diaphragms for shaping the beam in both the main scanning direction and the sub scanning direction at the same position as the sub scanning opening 172.

Further, the main scanning diaphragms 174a and 174b each have a plate-like shape. Therefore, it is possible to reduce costs rather than using two main scanning diaphragms.

The main scanning diaphragms 174 will be further described with reference to FIG. 11 to FIG. 18. FIG. 11 to FIG. 18 are drawings for explaining functions of the main scanning diaphragm 174. In FIG. 11 to FIG. 18, the upstream side in the rotational direction CCW of the polygon mirror 151 is defined as the positive side, and the downstream side is defined as the negative side. FIG. 11 to FIG. 18 show an image plane IS on the left side. The beam B deflected by the polygon mirror 151 scans the image plane IS from the positive side to the negative side. FIG. 11 to FIG. 18 does not show the optical path between the polygon mirror 151 and the image plane IS and the components disposed thereon. While the polygon mirror 151-8 is shown in FIG. 11 to FIG. 18, the polygon mirror 151-7 is also shown by dashed lines for comparison. Here, the polygon mirrors 151-7 and 151-8 have the same inscribed circle radius D.

Figure 11:
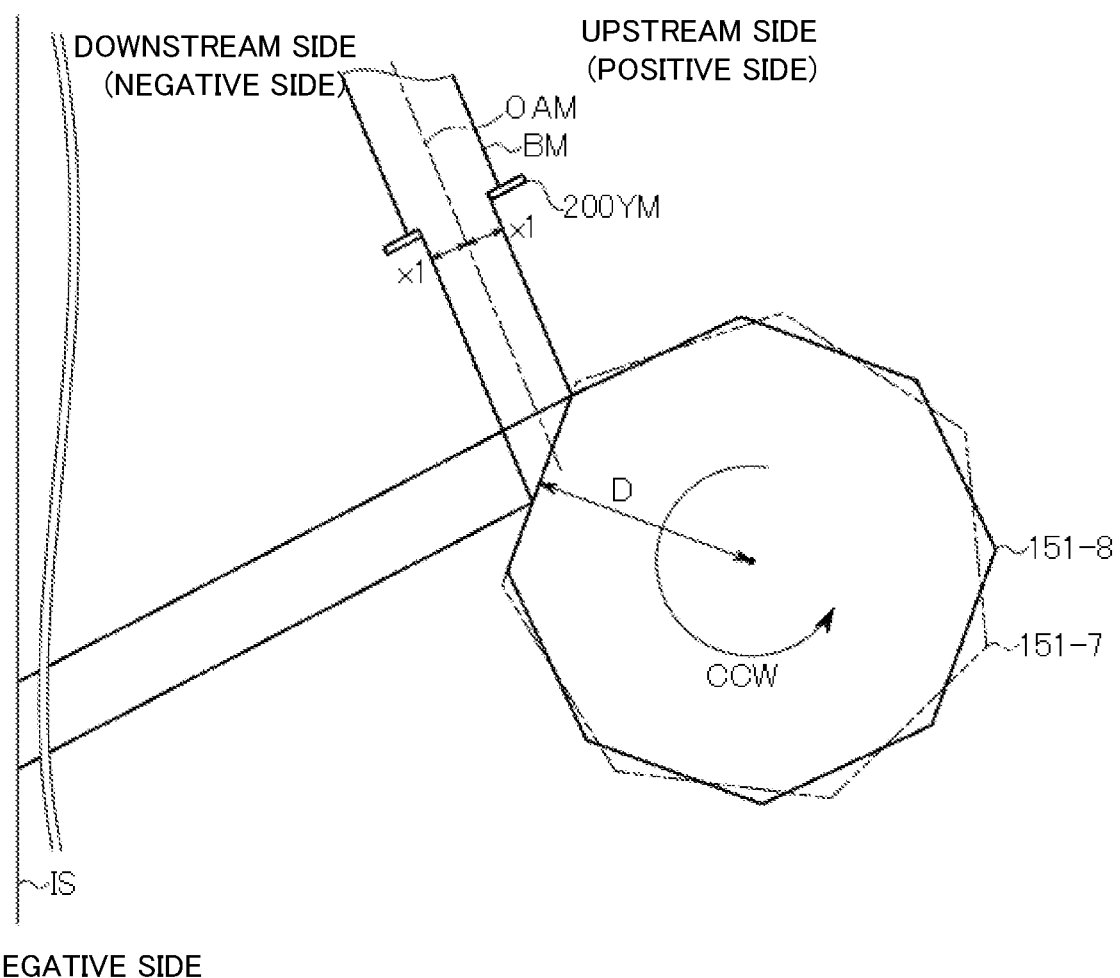
FIGS. 11-14 are diagrams for explaining functions of a main scanning diaphragm for comparison.
Figure 12:
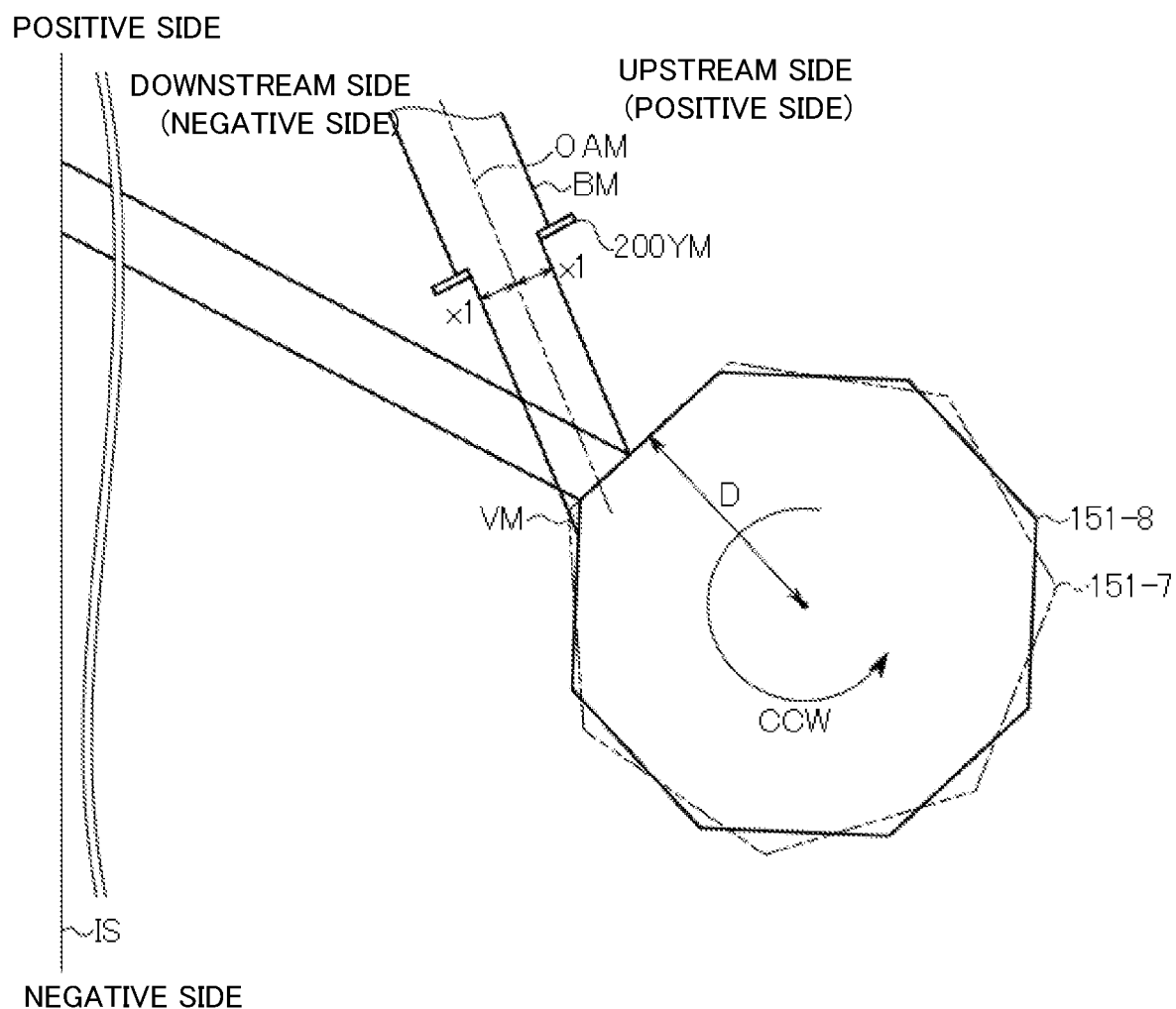

FIG. 11 is a diagram illustrating a state in which the beam BM shaped by the main scanning diaphragm 200YM as a comparative example is deflected towards the negative side of the image plane IS. FIG. 12 is a diagram illustrating a state in which the beam BM shaped by the main scanning diaphragm 200YM is deflected towards the positive side of the image plane IS. As shown in FIGS. 11 and 12, the beam BM is shaped by the main scanning diaphragm 200YM so that the width from the optical axis OAM to an end of the beam BM on the upstream side is identical to the width from the optical axis OAM to the other end of the beam BM on the downstream side, e.g., x1. As shown in FIGS. 11 and 12, the beam BM is shaped by the main scanning diaphragm 200YM so that vignetting is not caused by the polygon mirror 151-7. However, when the polygon mirror 151-8 is used, since the length of one side of the polygon mirror 151-8 is shorter than the length of one side of the polygon mirror 151-7, vignetting VM occurs on the negative side, that is, a part of the beam BM protrudes from the reflection surface 1511 toward the negative side, as shown in FIG. 12. On the contrary, as shown in FIG. 11, since the end of the beam BM on the positive side is reflected by the end of the reflection surface 1511, no vignetting occurs in the polygon mirror 151-8.

Figure 13:
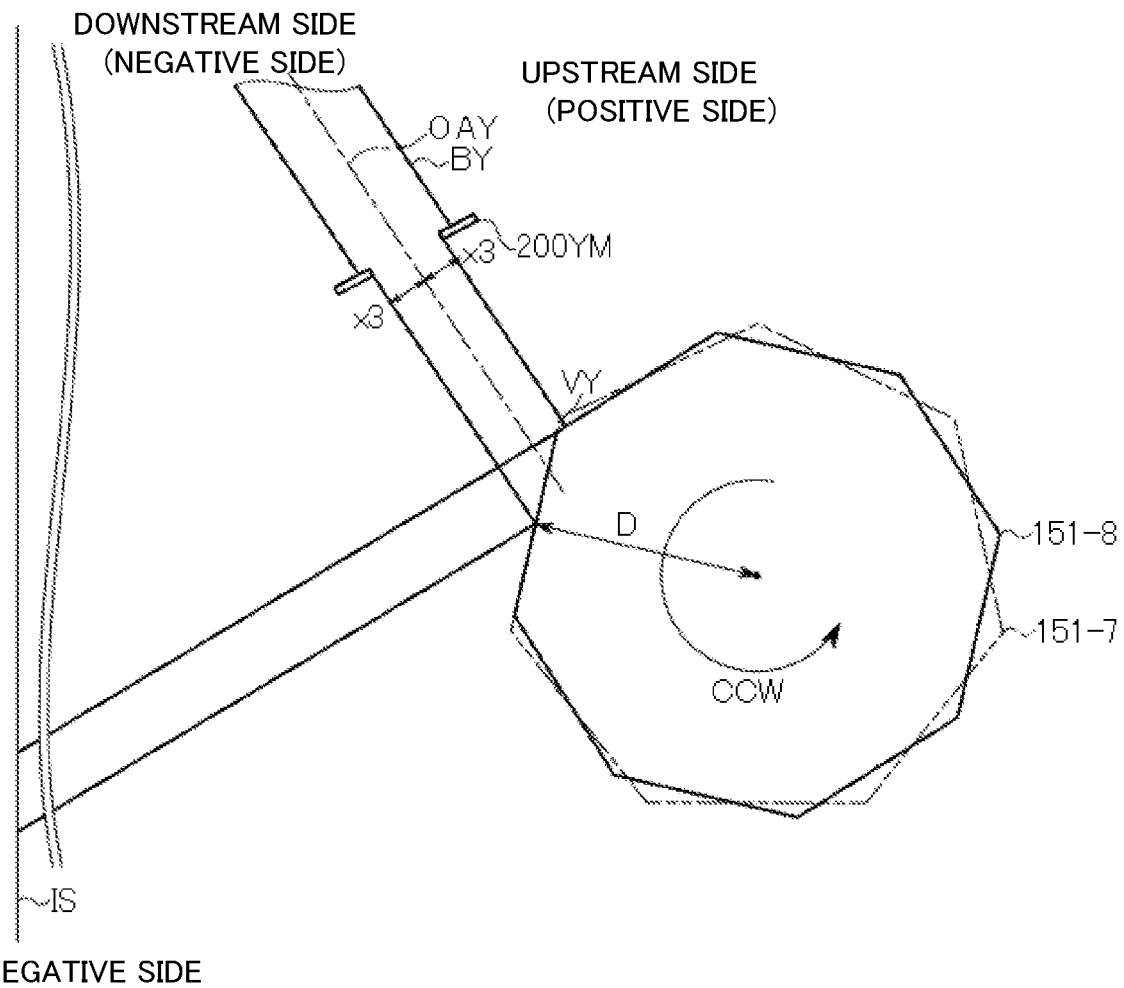
Figure 14:
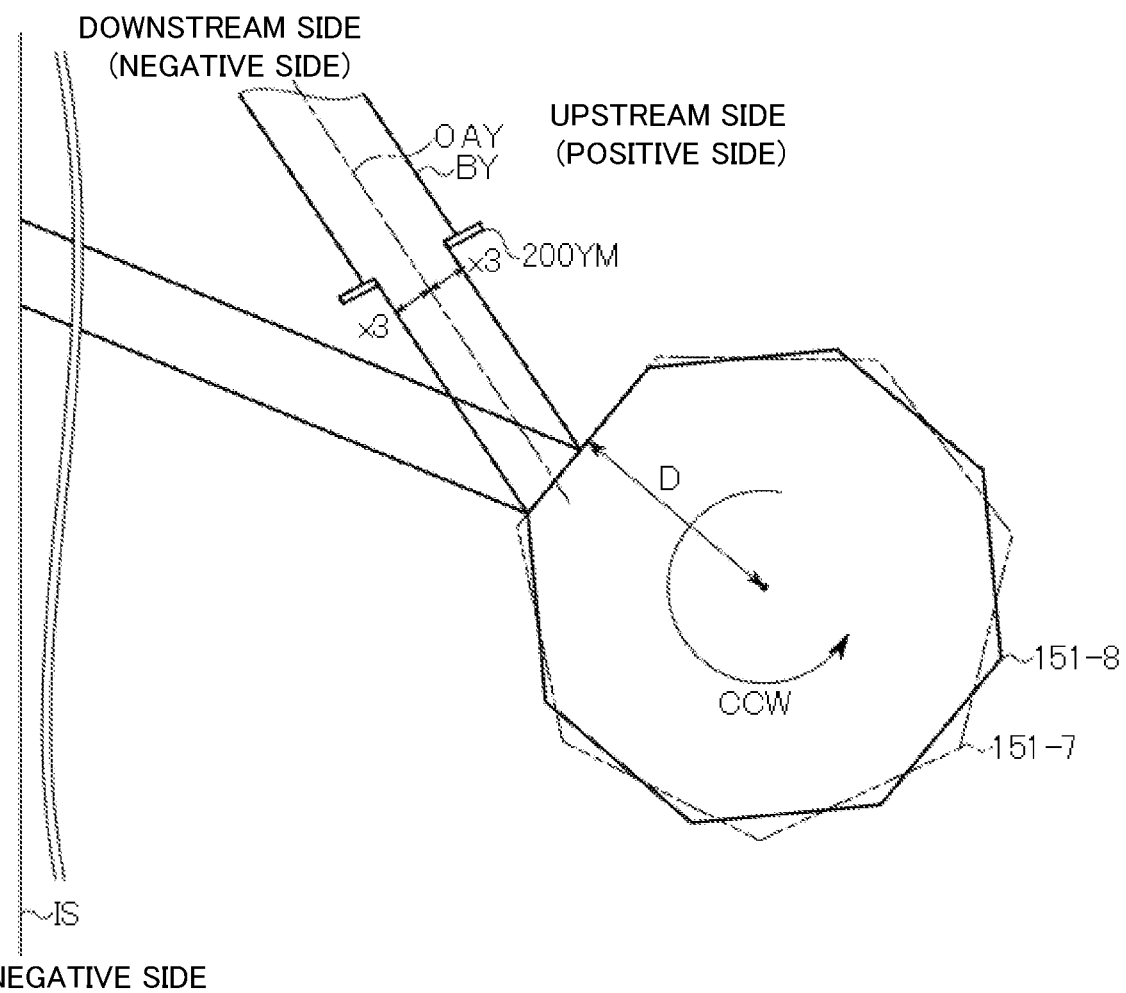

FIG. 13 is a diagram showing a state in which the beam BY shaped by the main scanning diaphragm 200YM is deflected towards the negative side of the image plane IS. FIG. 14 is a diagram showing a state in which the beam BY shaped by the main scanning diaphragm 200YM is deflected towards the positive side of the image plane IS. As shown in FIGS. 13 and 14, the beam BY is shaped by the main scanning diaphragm 200YM so that the width from the optical axis OAY to an end of the beam BM on the upstream side is identical to the width from the optical axis OAY to the other end of the beam BM on the downstream side, e.g., x3. As shown in FIGS. 13 and 14, the beam BY is shaped by the main scanning diaphragm 200YM so that vignetting is not caused by the polygon mirror 151-7. However, when the polygon mirror 151-8 is used, since the length of one side of the polygon mirror 151-8 is shorter than the length of one side of the polygon mirror 151-7, vignetting VY occurs on the positive side, that is, a part of the beam BY protrudes from the reflection surface 1511 towards the positive side, as shown in FIG. 13. On the other hand, as shown in FIG. 14, since the end of the beam BY on the negative side is reflected by the end of the reflection surface 1511, no vignetting occurs even in the polygon mirror 151-8.

Figure 15:
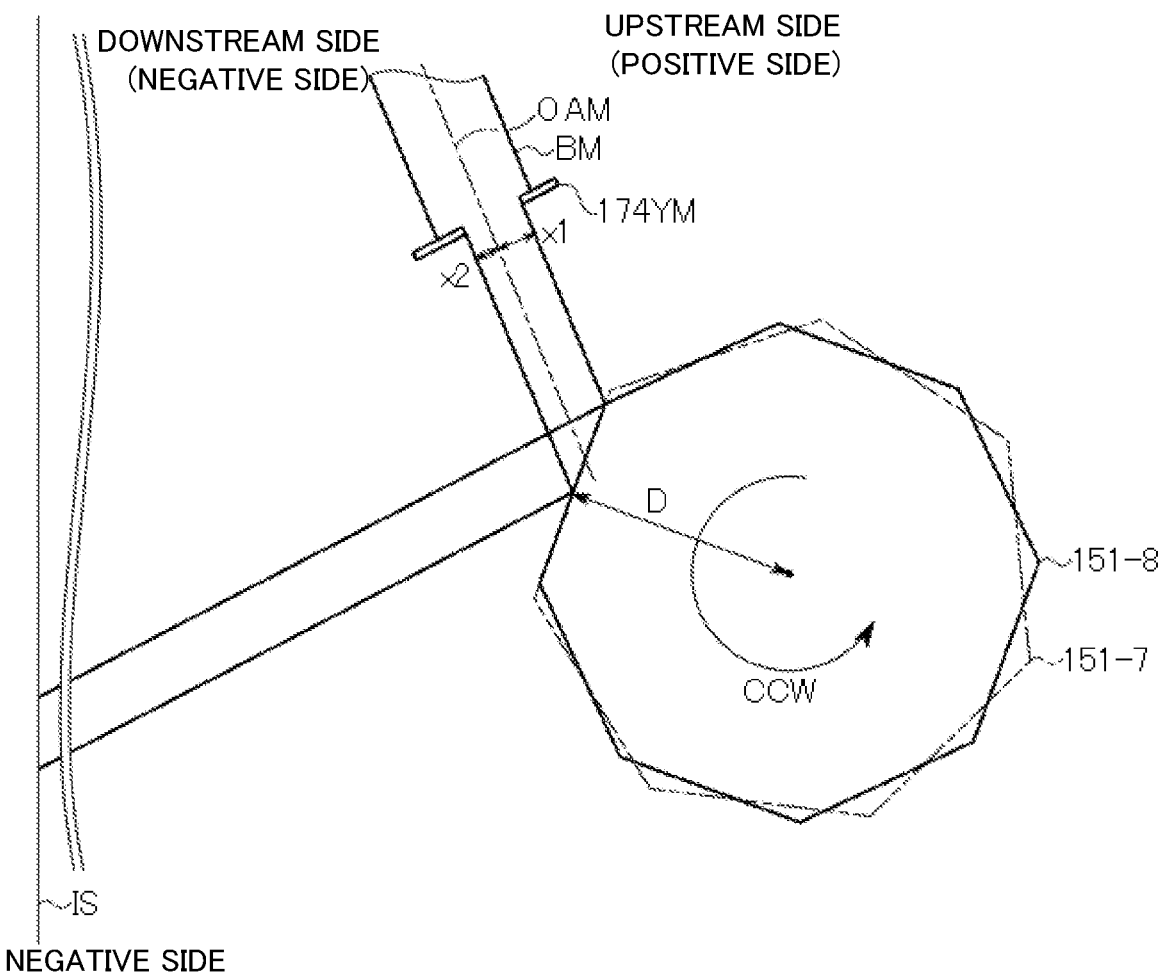
FIGS. 15-18 are diagrams for explaining functions of a main scanning diaphragm.
Figure 16:
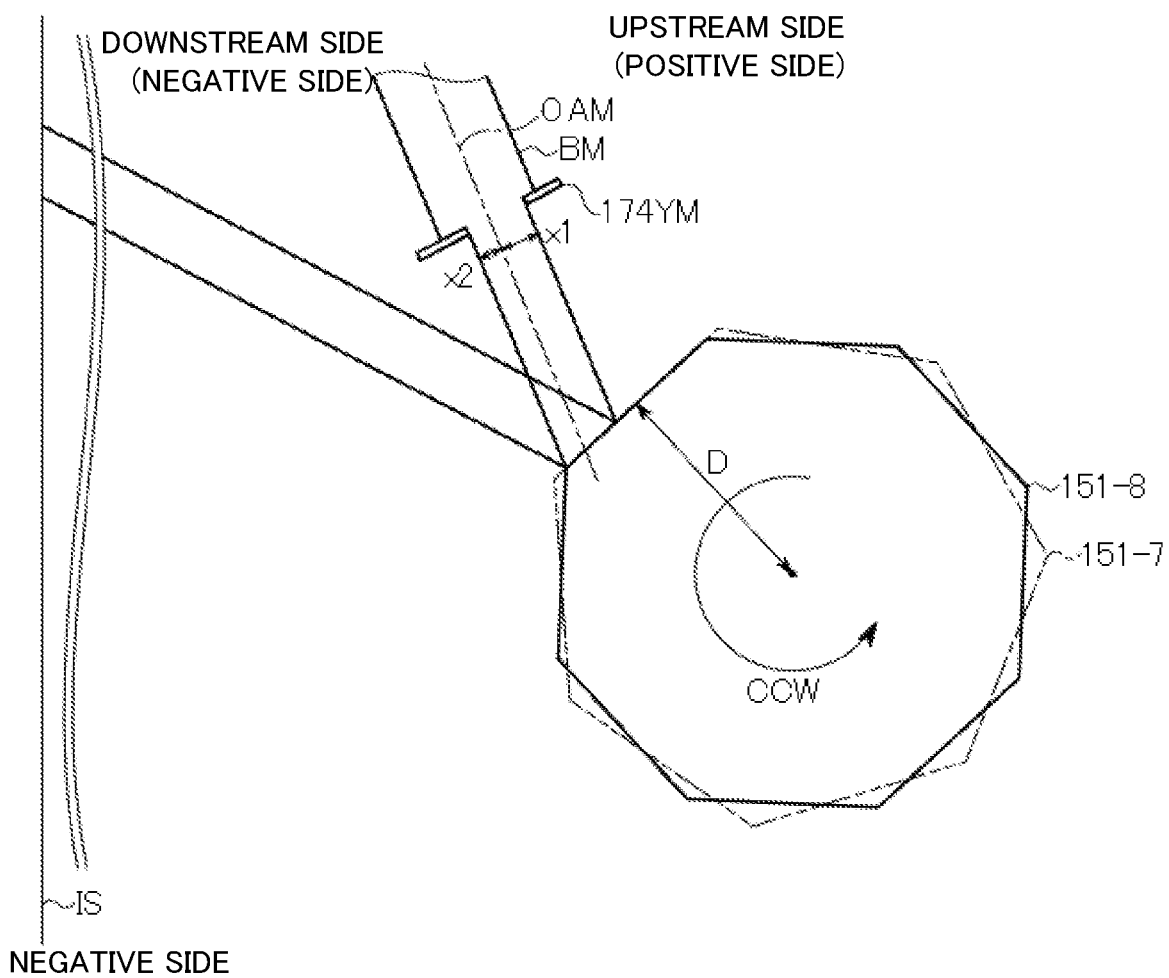

FIG. 15 is a diagram illustrating a state in which the beam BM shaped by the main scanning diaphragm 174YM is deflected towards the negative side of the image plane IS. FIG. 16 is a diagram illustrating a state in which the beam BM shaped by the main scanning diaphragm 174YM is deflected towards the positive side of the image plane IS. As shown in FIGS. and 16, the beam BM is shaped by the main scanning diaphragm 174YM so as to have a width x1 from the optical axis OAM to an end of the beam BM on the upstream side and a width x2 from the optical axis OAM to the other end of the beam BM on the downstream side. Since the beam BM enters the main scanning diaphragm 174YM substantially vertically, it can be regarded as x1=xM1 and x2=xM2, where x2 is smaller than x1. That is, the width of the beam BM shaped by the main scanning diaphragm 174YM between the optical axis OAM and the end of the beam BM on the upstream side is identical with the width of the beam BM shaped by the main scanning diaphragm 200YM. Further, the width of the beam BM shaped by the main scanning diaphragm 174YM between the optical axis OAM and the other end of the beam BM on the downstream side is shorter than the width of the beam BM shaped by the main scanning diaphragm 200YM. Therefore, as shown in FIG. 15, in the beam BM shaped by the main scanning diaphragm 174YM, in the same manner as the beam BM shaped by the main scanning diaphragm 200YM, no vignetting occurs in both the polygon mirror 151-7 and the polygon mirror 151-8 on the positive side of the reflection surface 1511. Then, as shown in FIG. 16, the beam BM shaped by the main scanning diaphragm 174YM is different from the beam BM shaped by the main scanning diaphragm 200YM in that no vignetting occurs in both the polygon mirror 151-7 and the polygon mirror 151-8 on the negative side of the reflection surface 1511.

Figure 17:
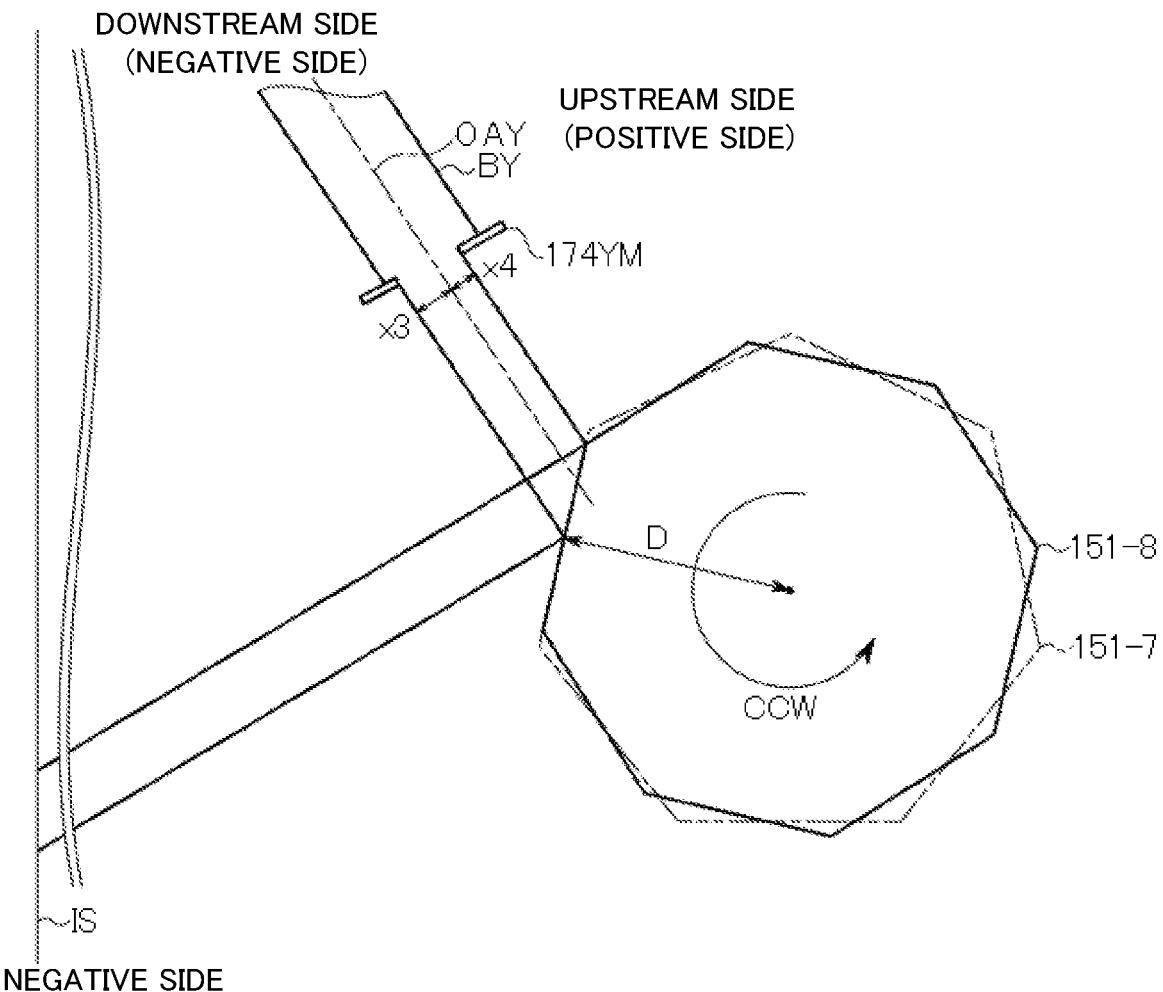
Figure 18:
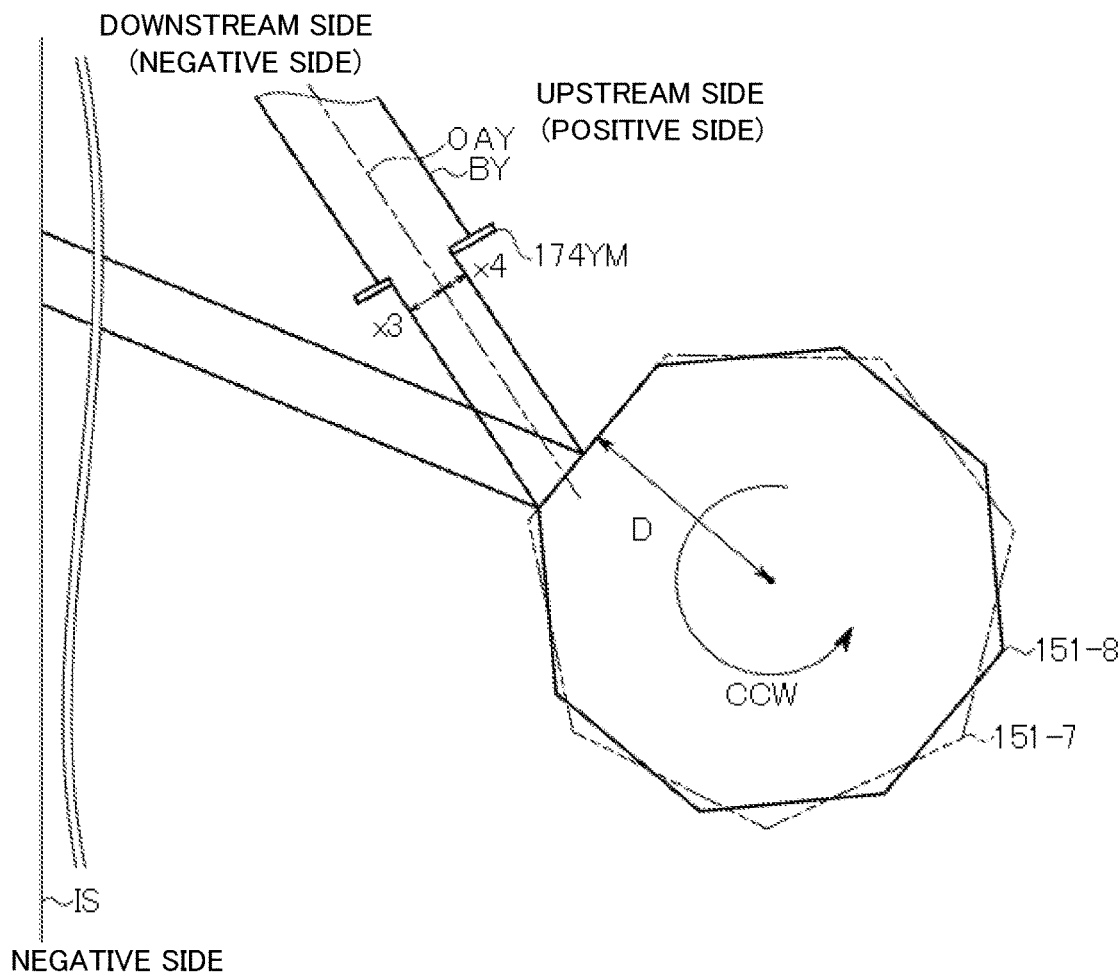

FIG. 17 is a diagram showing a state in which the beam BY shaped by the main scanning diaphragm 174YM is deflected towards the negative side of the image plane IS. FIG. 18 is a diagram showing a state in which the beam BY shaped by the main scanning diaphragm 174YM is deflected towards the positive side of the image plane IS. As shown in FIGS. 17 and 18, the beam BY is shaped by the main scanning diaphragm 174YM so as to have a width x3 from the optical axis OAY and an end of the beam BY on the downstream side and a width x4 from the optical axis OAY and the other end of the beam BY on the upstream side. Since the beam BY enters the main scanning diaphragm 174YM substantially vertically, it can be regarded as x3=xY1 and x4=xY2, where x4 is smaller than x3. That is, the width of the beam BY shaped by the main scanning diaphragm 174YM between the optical axis OAY and the end of the beam BM on the downstream side is identical with the width of the beam BY shaped by the main scanning diaphragm 200YM. In addition, the width of the beam BY formed by the main scanning diaphragm 174YM between the optical axis OAY and the other end of the beam BM on the upstream side is shorter than the beam formed by the main scanning diaphragm 200YM. For this reason, as shown in FIG. 17, the beam shaped by the main scanning diaphragm 174YM is different from the beam BY shaped by the main scanning diaphragm 200YM in that no vignetting occurs in both of the polygon mirror 151-7 and the polygon mirror 151-8 on the positive side. Then, as shown in FIG. 18, in the beam BY shaped by the main scanning diaphragm 174YM, no vignetting occurs in both the polygon mirrors 151-7 and 151-8 on the negative side, similarly to the beam shaped by the main scanning diaphragm 200YM.

In this way, by using the main scanning diaphragm 174YM in which the lengths xY1, xY2, xM1 and xM2 are appropriately set, the optical scanning device 116 can prevent the vignetting from occurring even when the polygon mirror 151 having the different number of surfaces is used.

Although the main scanning diaphragm 174YM is described in the aforementioned embodiments, the same effects are achieved by the main scanning diaphragm 174CK, which shapes the beams BC and BK similar to the main scanning diaphragm 174YM.

As described above, the image forming apparatus 100 of the embodiments can use the polygon mirror 151 having a different number of surfaces. Therefore, since the image forming apparatus 100 of the embodiments can share the housings with different models using the polygon mirrors 151 having different numbers of surfaces, it is possible to reduce the manufacturing cost.

Figure 19:
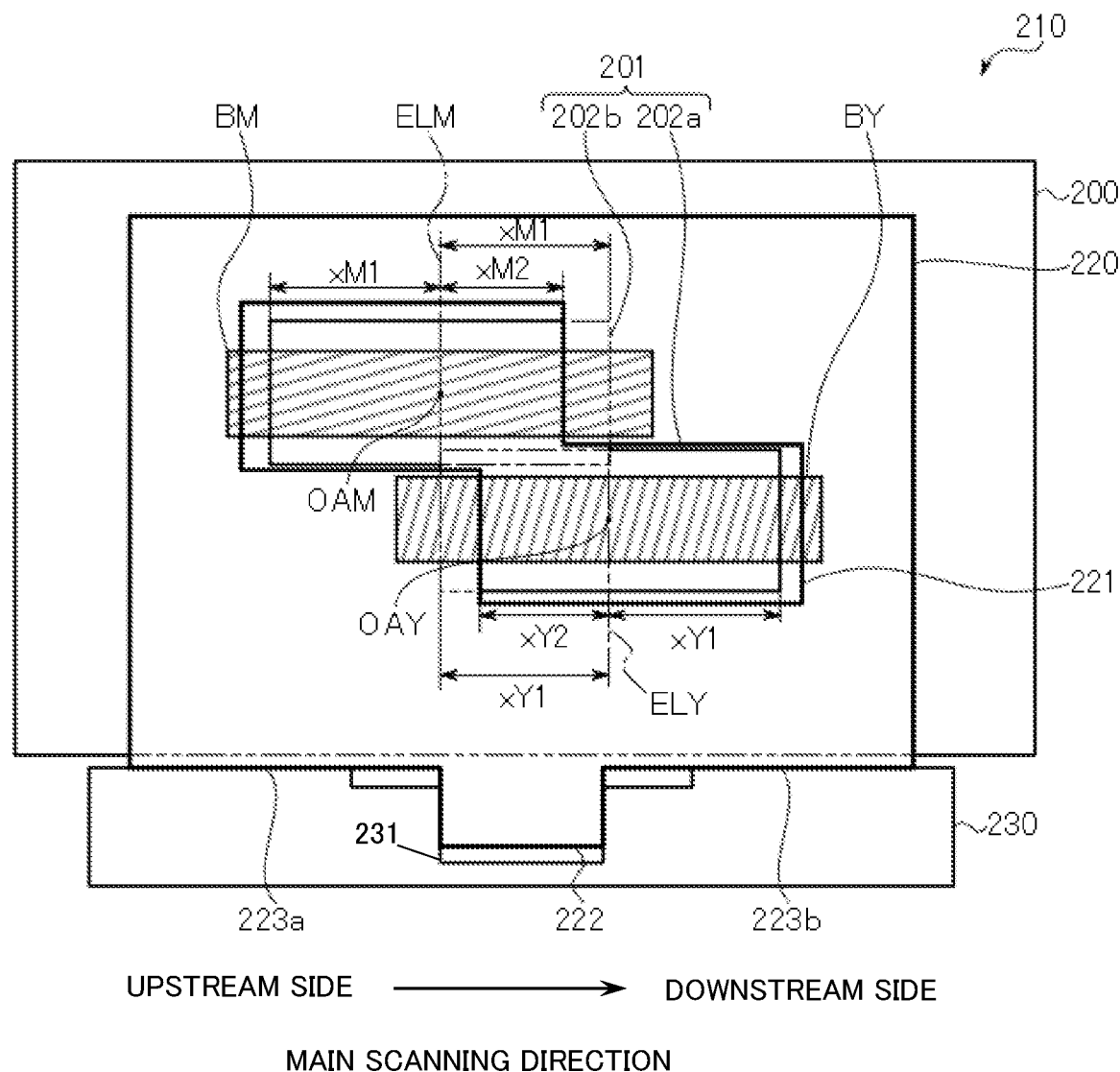
FIG. 19 is a diagram showing a modification example of a main scanning diaphragm.

The above embodiments can also be modified as follows. Instead of the main scanning diaphragm 174, a main scanning diaphragm 210 as shown in FIG. 19 may be provided. FIG. 19 is a diagram showing a modified example of the main scanning diaphragm. The main scanning opening 210 that shapes the beams BY and BM will be described for illustration purpose.

The main scanning diaphragm 210 includes the main scanning diaphragm 200 and a second main scanning diaphragm 220. In FIG. 19, the second main scanning diaphragm 220 is indicated by a thick line for easy understanding. The main scanning diaphragm 210 allows an image forming apparatus using the main scanning diaphragm 200 that only works with the predetermined polygon mirror, to use another polygon mirror having a different number of surfaces.

The main scanning diaphragm 210 is formed by superposing the main scanning diaphragm 200 and the second main scanning diaphragm 220. Note that the main scanning diaphragm 200 and the second main scanning diaphragm 220 may be in close contact with each other, or may have a gap therebetween. In FIG. 19, the second main scanning diaphragm 220 is located closer to the light source 153 than the main scanning diaphragm 200. However, the second main scanning diaphragm 220 may be located farther from the light source 153 than the main scanning diaphragm 200.

The second main scanning diaphragm 220 has an opening 221 and a projection 222. The opening 221 includes an opening for shaping the beam BY and an opening for shaping the beam BM. The opening for shaping the beam BY has a length between the bisector ELY of the beam BY and an end of the opening on the downstream side, that is greater than or equal to xY1, and a length xY2 between the bisector ELY and the other end of the opening on the upstream side, that is less than xY1. The opening for shaping the beam BM has a length between the bisector ELM and an end of the opening on the upstream side, that is greater than or equal to xM1, and a length XM2 between the bisector ELM and the other end of the opening on the downstream side, that is less than xM1.

The second main scanning diaphragm 220 is attached to, for example, a fixing member 230. The fixing member 230 has a groove 231 for fitting a projection 222 of the second main scanning diaphragm 220. The projection 222 and the groove 231 fix the position of the second main scanning diaphragm in the main scanning direction by fitting the projection 222 into the groove 231. Further, the projection 222 and the groove 231 prevent the second main scanning opening 221 from moving in the main scanning direction. Further, the bottom portion 223a and the bottom portion 223b of the second main scanning diaphragm 220 are brought into contact with the upper surface of the fixing member 230, whereby the position of the second main scanning diaphragm 220 in the sub scanning direction is fixed.

Therefore, the main scanning diaphragm 200 shapes the downstream side of the beam BY in the main scanning direction and the upstream side of the beam BM in the main scanning direction into a desired shape. The second main scanning diaphragm 220 shapes the upstream side of the beam BY in the main scanning direction and the downstream side of the beam BM in the main scanning direction into a desired shape. Thus, the shape of the beam B shaped by the main scanning diaphragm 210 becomes similar to the shape of the beam B shaped by the main scanning diaphragm 174, and the occurrence of vignetting can be prevented.

The optical scanning device can be used with the main scanning diaphragm 210 when the polygon mirror 151-8 is used and without the main scanning diaphragm 210 when the polygon mirror 151-7 is used. Thus, the amount of light in the case of using the polygon mirror 151-7 can be higher than that in the case where the polygon mirror 151-8 is used.

In the embodiments described above, the main scanning diaphragm 174 has a single opening 175 in which two rectangular openings overlap each other. However, the main scanning diaphragm 174 may be divided into two or more members such that each member has a separate opening.

Figure 20:
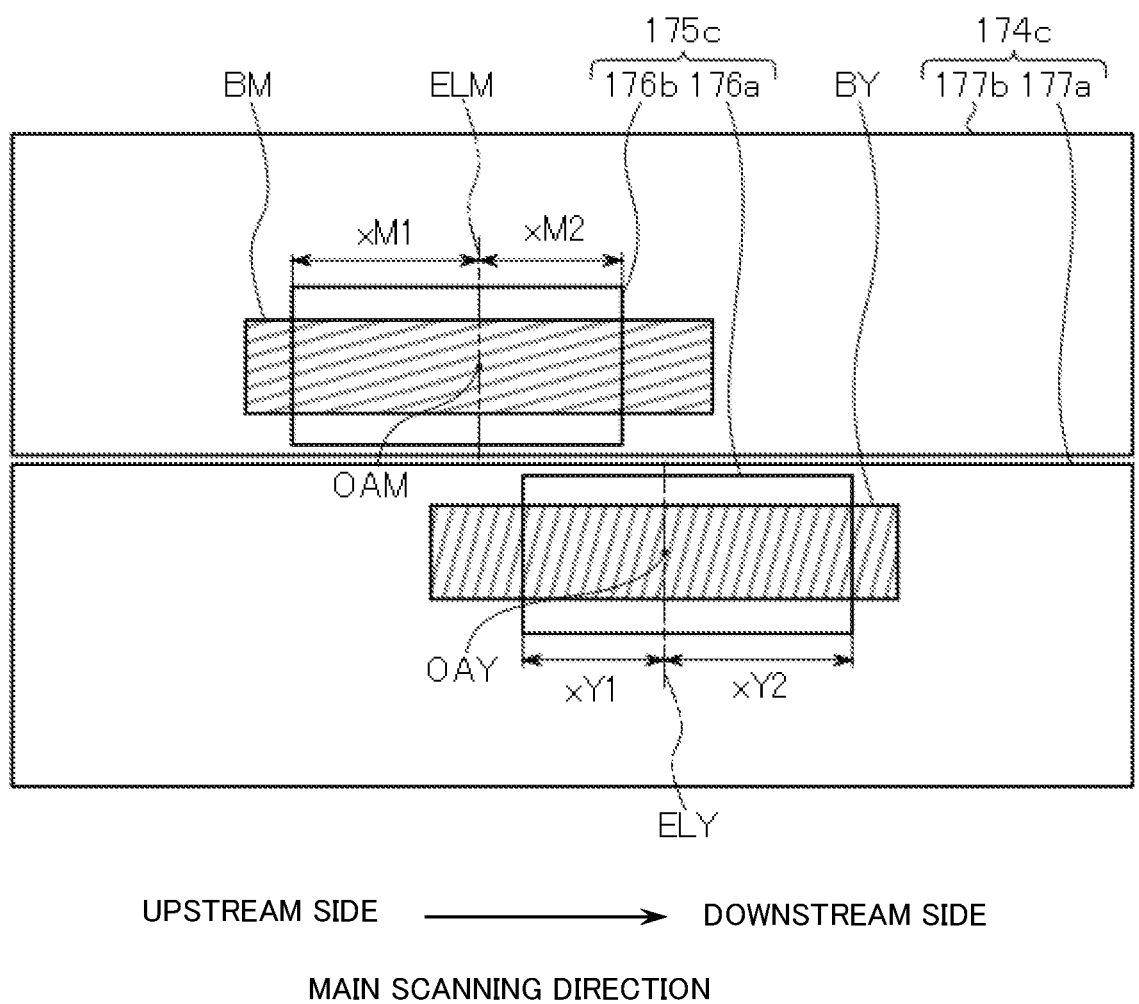
FIGS. 20 and 21 are diagrams each showing a main scanning diaphragm.

FIG. 20 shows a main scanning diaphragm 174c as an example of the main scanning diaphragm 174 divided into two or more members. The main scanning diaphragm 174c has openings 175c including two separate openings 176a and 176b. Further, the main scanning diaphragm 174c is divided into two members 177a and 177b that have the opening 176a and 176b, respectively.

Figure 21:
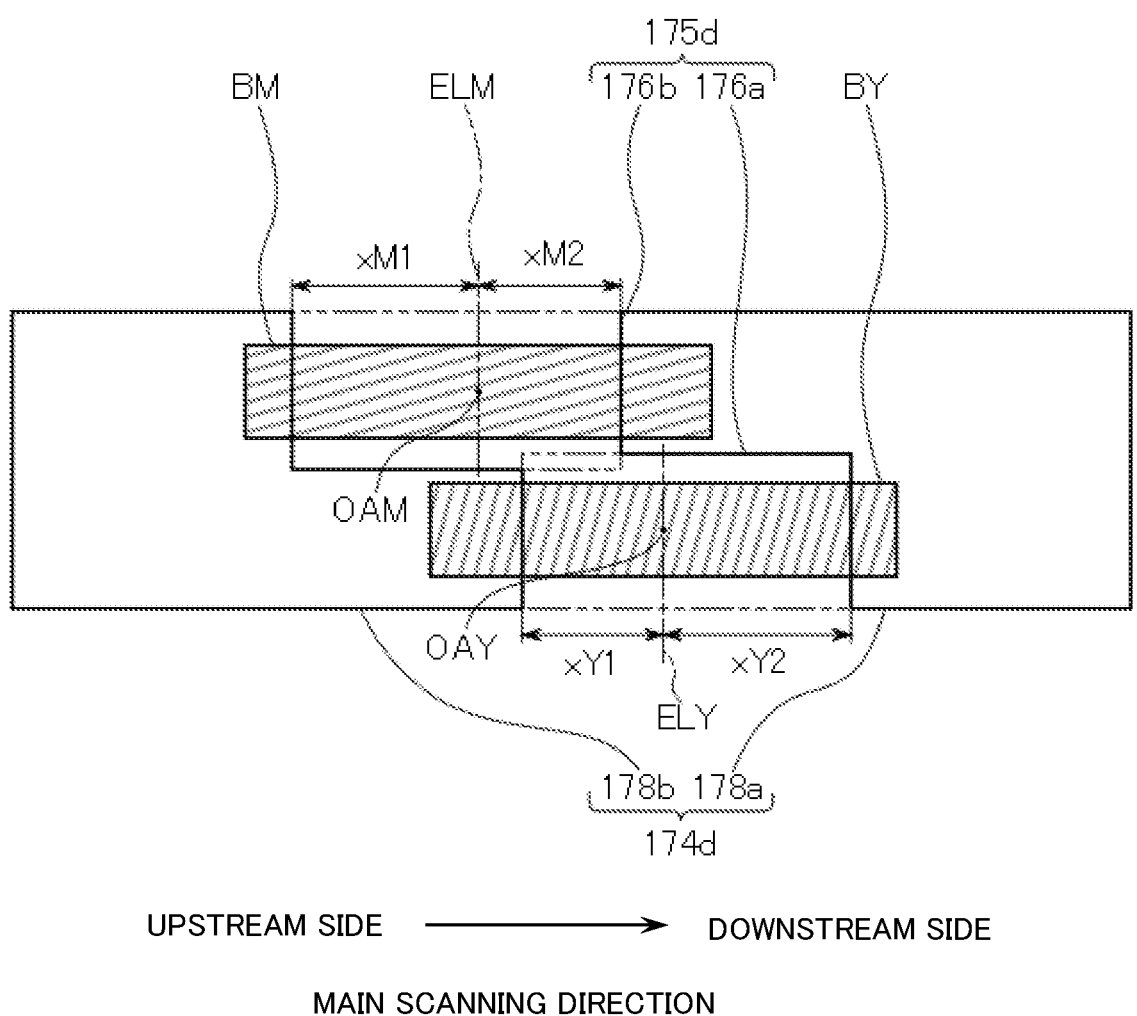

FIG. 21 shows a main scanning diaphragm 174d as another example of the main scanning diaphragm 174 divided into two or more members. The main scanning diaphragm 174d has an opening 175d as an example of the opening 175. The opening 175d has a shape in which two openings 176a and 176b overlap with each other. Further, the main scanning diaphragm 174d is divided into two members 178a and 178b in the main scanning direction. That is, since the width of the main scanning diaphragm 174d in the sub scanning direction is equal to or smaller than the width of the opening 175d in the sub scanning direction, the main scanning diaphragm 174d is divided into two members by the opening 175d.

In the embodiments described above, the shape of the opening 176 is rectangular. However, the shape of the opening 176 may be any shape other than a rectangular shape.

Figure 22:
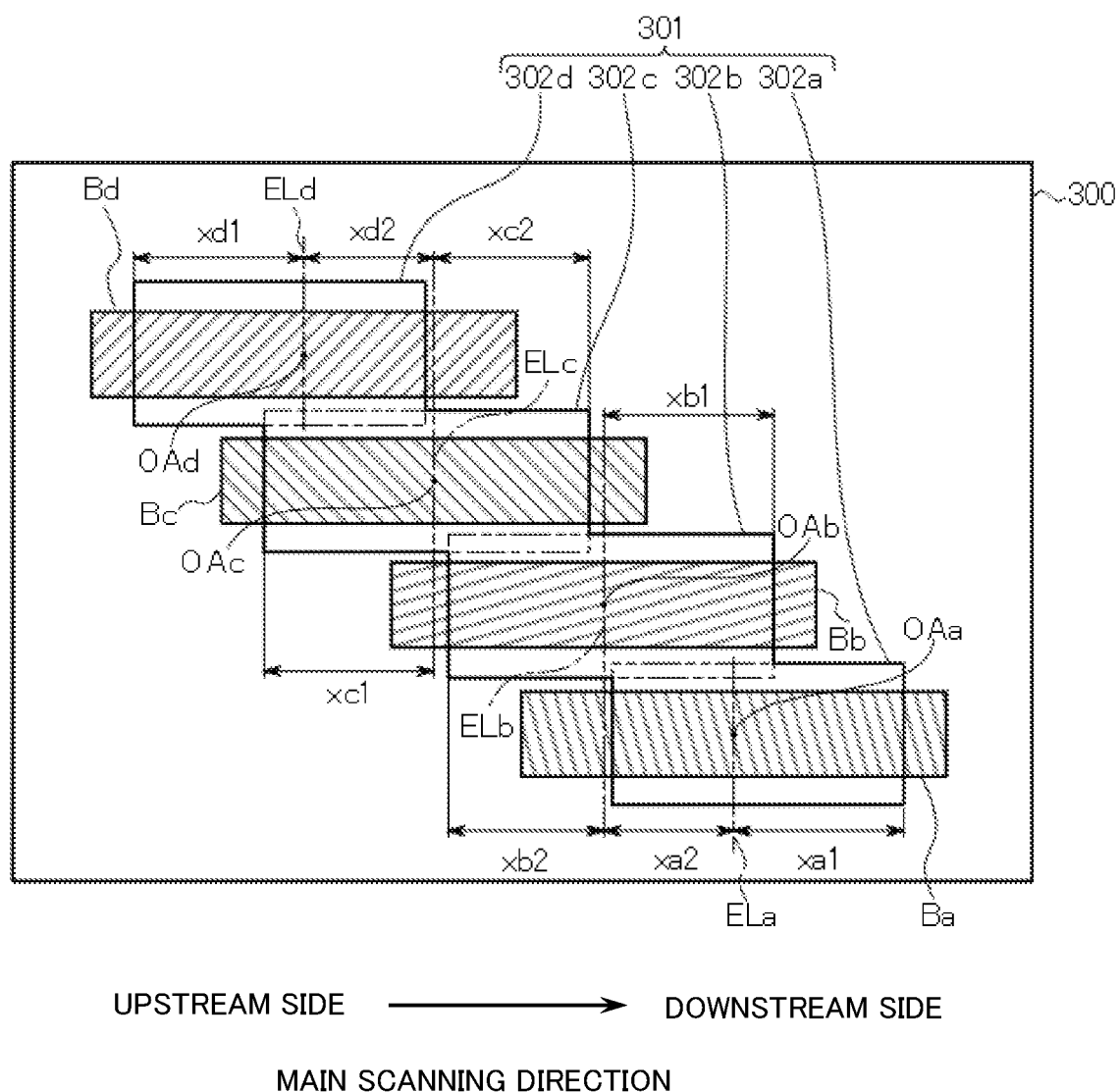
FIG. 22 is a diagram showing another modification example of a main scanning diaphragm.

In the above embodiments, the optical scanning device 116 has a configuration in which each of the photosensitive drum 1151 and the light source 153 of each color is disposed on either the left side or the right side of the polygon mirror 151. However, three or more photosensitive drums 1151 and light sources 153 may be disposed on one side of the polygon mirror 151. In such a case, three or more beams B are reflected by the same reflection surface 1511. FIG. 22 shows an example of the shape of the main scanning diaphragm when four beams B are reflected by such a same reflection surface. As shown in FIG. 22, the main scanning diaphragm 300 includes an opening 301. The opening 301 has a shape in which four openings 302a to 302d are connected to each other. The shape of each opening 302a to 302d is a rectangle having a width in the sub scanning direction, which is larger than the width in the sub scanning direction of the corresponding beam B. The openings 302a and 302b partially overlap with each other, and thus are connected to each other. The openings 302b and 302c partially overlap with each other, and thus are connected to each other. The openings 302c and 302d partially overlap with each other, and thus are connected to each other. However, at least one of the following combinations: the openings 302a and 302b, the openings 302b and 302c, and the openings 302c and 302d, may not overlap with each other. In such a case, the opening portion 301 includes a plurality of openings which are not connected to each other. The beam B passes through the opening 320a to the openings 320d. That is, the beam Ba passes through the opening 320a, the bream Bb passes through the opening 320b, the beam Bc passes through the opening 320c, and the beam Bd passes through the opening 320d. Thus, the openings 302a to 320d shape the beams Ba to Bd in the main scanning direction.

The length of the opening 302a between the bisector ELa and an end of the opening 302a on the downstream side in the main scanning direction is xa1, and the length of the opening 302a between the bisector ELa and the other end of the opening 302a on the upstream side is xa2. The length of the opening 302b between the bisector ELb and an end of the opening 302b on the downstream side is xb1, and the length of the opening 302b between the bisector ELb and the other end of the opening 302b on the upstream side in xb2. The length of the opening 302c between the bisector ELc and an end of the opening 302c on the upstream side is xc1, and the length of the opening 302c between the bisector ELc and the other end of the opening 302c on the downstream side is xc2. The length of the opening 302d between the bisector ELd and an end of the opening 302d on the upstream side is xd1, and the length of the opening 302d between the bisector ELd and the other end of the opening 302d on the downstream side is xd2. Thus, xa1, xa2, xd1, and xd2 have the following relationships: xa1>xa2 and xd1>xd2. Further, xb1, xb2, xc1, and xc2 have the following relationships: xb1≥xb2 and xc1≥xc2, for example. Alternatively, xb1, xb2, xc1, and xc2 may have the following relationships: xb1≤xb2 and xc1≥xc2. Alternatively, xb1, xb2, xc1, and xc2 may have the relationships: xb1≥xb2 and xc1≤xc2.

In the embodiments described above, the image forming apparatus 100 uses four types of recording materials corresponding to four colors of CMYK. However, the image forming apparatus of the embodiments may employ two, three, five, or more types of recording materials. In such a case, the image forming apparatus have the same number of photosensitive drums and light sources as the number of the types of recording materials.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. These embodiments and variations thereof are included in the scope and spirit of the invention and are included within the scope of the appended claims and their equivalents.

What is claimed is:

1. An optical scanning device, comprising:
a first light source configured to emit a first beam;
a second light source configured to emit a second beam and arranged on an upstream side of the first light source in a main scanning direction;
a diaphragm including:
a first opening that passes first and second portions of the first beam, the first portion having a first width from a first light axis of the first beam on the upstream side in the main scanning direction, the second portion having a second width from the first light axis on a downstream side in the main scanning direction, the first width being narrower than the second width, and
a second opening that passes first and second portions of the second beam, the first portion having a third width from a second light axis of the second beam on the upstream side in the main scanning direction, the second portion having a fourth width from the second light axis on the downstream side in the main scanning direction, the third width being wider than the fourth width; and a deflector configured to deflect the first and second beams that have passed through the diaphragm at first and second positions on a surface of the deflector, the first and second positions being shifted in a sub scanning direction perpendicular to the main scanning direction.

2. The optical scanning device according to claim 1, wherein the first and second openings are continuous.

3. The optical scanning device according to claim 1, further comprising:
a first lens arranged between the first light source and the diaphragm and focusing the first beam onto the deflector, and
a second lens arranged between the second light source and the diaphragm and focusing the second beam onto the deflector.

4. The optical scanning device according to claim 3, further comprising:
a cover glass arranged between each of the first and second lenses and the diaphragm and through which the focused first and second beams pass.

5. The optical scanning device according to claim 1, wherein the deflector is a rotatable polygon mirror configured to deflect the first and second beams to respective image planes.

6. The optical scanning device according to claim 5, wherein the sub scanning direction is parallel to a rotation axis of the polygon mirror.

7. The optical scanning device according to claim 1, wherein the second light source is arranged at a higher position than the first light source when viewed from the deflector.

8. The optical scanning device according to claim 1, wherein the first opening is included in a first diaphragm and the second opening is included in a second diaphragm.

9. The optical scanning device according to claim 1, further comprising:
a third light source configured to emit a third beam;
a fourth light source configured to emit a fourth beam and arranged on a downstream side of the third light source in the main scanning direction;
a third opening that passes first and second portions of the third beam, the first portion having a fifth width from a third light axis of the third beam on the downstream side in the main scanning direction, the second portion having a sixth width from the third light axis on an upstream side in the main scanning direction, the fifth width being narrower than the sixth width; and
a fourth opening that passes first and second portions of the fourth beam, the first portion having a seventh width from a fourth light axis of the fourth beam on the downstream side in the main scanning direction, the second portion having a eighth width from the third light axis on the upstream side in the main scanning direction, the seventh width being wider than the eighth width, wherein
the deflector is further configured to deflect the third and fourth beams that have passed the diaphragm at third and fourth positions on another surface of the deflector, the third and fourth positions are shifted in the sub scanning direction.

10. The optical scanning device according to claim 9, wherein the third and fourth openings are included in a second diaphragm.

11. An image forming apparatus, comprising:
an optical scanning device including:
a first light source configured to emit a first beam,
a second light source configured to emit a second beam and arranged on an upstream side of the first light source in a main scanning direction;
a first opening that passes first and second portions of the first beam, the first portion having a first width from a first light axis of the first beam on the upstream side in the main scanning direction, the second portion having a second width from the first light axis on a downstream side in the main scanning direction, the first width being narrower than the second width;
a second opening that passes first and second portions of the second beam, the first portion having a third width from a second light axis of the second beam on the upstream side in the main scanning direction, the second portion having a fourth width from the second light axis on the downstream side in the main scanning direction, the third width being wider than the fourth width; and
a deflector configured to deflect the first and second beams that have passed through the diaphragm at first and second positions on a surface of the deflector, the first and second positions being shifted in a sub scanning direction perpendicular to the main scanning direction; and
a transfer unit by which an electrostatic latent image formed by the deflected first and second beams on an imaging surface is transferred to a medium.

12. The image forming apparatus according to claim 11, wherein the first and second openings are continuous.

13. The image forming apparatus according to claim 11, wherein
the first and second openings are in a first diaphragm,
the optical scanning device further comprises:
a first lens arranged between the first light source and the first diaphragm and focusing the first beam onto the deflector, and
a second lens arranged between the second light source and the first diaphragm and focusing the second beam onto the deflector.

14. The image forming apparatus according to claim 13, wherein the optical scanning device further comprises:
a cover glass arranged between each of the first and second lenses and the first diaphragm and through which the focused first and second beams pass.

15. The image forming apparatus according to claim 11, wherein the deflector is a rotatable polygon mirror configured to deflect the first and second beams to respective image planes.

16. The image forming apparatus according to claim 15, wherein the sub scanning direction is parallel to a rotation axis of the polygon mirror.

17. The image forming apparatus according to claim 11, wherein the second light source is arranged at a higher position than the first light source when viewed from the deflector.

18. The image forming apparatus according to claim 11, wherein the first opening is included in a first diaphragm and the second opening is included in a second diaphragm.

19. The image forming apparatus according to claim 11, wherein the optical scanning device further comprises:
a third light source configured to emit a third beam;
a fourth light source configured to emit a fourth beam and arranged on a downstream side of the third light source in a main scanning direction;
a third opening that passes first and second portions of the third beam, the first portion having a fifth width from a third light axis of the third beam on the downstream side in the main scanning direction, the second portion having a sixth width from the third light axis on an upstream side in the main scanning direction, the fifth width being narrower than the sixth width; and a fourth opening that passes first and second portions of the fourth beam, the first portion having a seventh width from a fourth light axis of the fourth beam on the downstream side in the main scanning direction, the second portion having a eighth width from the third light axis on the upstream side in the main scanning direction, the seventh width being wider than the eighth width, wherein the deflector is further configured to deflect the third and fourth beams that have passed the diaphragm at third and fourth positions on another surface of the deflector, the third and fourth positions are shifted in the sub scanning direction.

20. The image forming apparatus according to claim 19, wherein the first and second openings are included in a first diaphragm and the third and fourth openings are included in a second diaphragm.

\* \* \* \* \*